(12) United States Patent
Katou

(10) Patent No.: US 12,191,735 B2
(45) Date of Patent: Jan. 7, 2025

(54) STATOR WITH GUIDE GROOVE

(71) Applicant: DENSO CORPORATION, Kariya (JP)

(72) Inventor: Shigemasa Katou, Kariya (JP)

(73) Assignee: DENSO CORPORATION, Kariya (JP)

( * ) Notice: Subject to any disclaimer, the term of this patent is extended or adjusted under 35 U.S.C. 154(b) by 326 days.

(21) Appl. No.: 17/679,791

(22) Filed: Feb. 24, 2022

(65) Prior Publication Data
US 2022/0181943 A1    Jun. 9, 2022

Related U.S. Application Data

(63) Continuation of application No. PCT/JP2020/031914, filed on Aug. 25, 2020.

(30) Foreign Application Priority Data

Aug. 28, 2019 (JP) ................. 2019-155809

(51) Int. Cl.
H02K 3/52 (2006.01)
(52) U.S. Cl.
CPC ......... H02K 3/522 (2013.01); *H02K 2203/06* (2013.01)
(58) Field of Classification Search
CPC .................. H02K 3/522; H02K 2203/06
See application file for complete search history.

(56) References Cited

U.S. PATENT DOCUMENTS

| 2013/0200742 | A1  | 8/2013 | Seki et al. | |
|---|---|---|---|---|
| 2014/0062249 | A1* | 3/2014 | Nagao | B21D 53/00 |
| | | | | 310/216.089 |
| 2015/0102696 | A1* | 4/2015 | Kanda | H02K 3/28 |
| | | | | 29/596 |
| 2015/0137638 | A1* | 5/2015 | Kageme | H02K 21/22 |
| | | | | 310/71 |
| 2017/0141627 | A1  | 5/2017 | Seki et al. | |
| 2020/0036239 | A1  | 1/2020 | Seki et al. | |

FOREIGN PATENT DOCUMENTS

| CN | 102780287 A | * 11/2012 | ............ H02K 3/522 |
|---|---|---|---|
| JP | 2012034540 A | * 2/2012 | ............ H02K 1/148 |
| JP | 2013-153590 A | 8/2013 | |
| JP | 2013-162726 A | 8/2013 | |
| JP | 2013-243800 A | 12/2013 | |
| JP | 2015-133808 A | 7/2015 | |

OTHER PUBLICATIONS

Nov. 10, 2020 International Search Report issued in International Patent Application No. PCT/JP2020/031914.

* cited by examiner

*Primary Examiner* — Jeremy A Luks
(74) *Attorney, Agent, or Firm* — Oliff PLC

(57) ABSTRACT

In a V-phase stator component in which a plurality of V-phase insulators are separate from each other, the V-phase insulator corresponding to a second V-phase winding includes a flange portion which is provided with a first guide groove for guiding a winding start portion led out of the second V-phase winding and connected to a crossover wire portion, and a second guide groove for guiding a winding end portion led out of the second V-phase winding and connected to a crossover wire portion. The first and second guide grooves are provided with respective retaining portions formed so that an opening width is smaller than the diameter of the conductor wire.

10 Claims, 13 Drawing Sheets

STATOR WITH GUIDE GROOVE

CROSS-REFERENCE TO RELATED APPLICATION

The present application is a continuation application of International Application No. PCT/JP2020/031914, filed Aug. 25, 2020, which claims priority to Japanese Patent Application No. 2019-155809 filed Aug. 28, 2019. The contents of these applications are incorporated herein by reference in their entirety.

BACKGROUND

Technical Field

The present disclosure relates to stators.

Background Art

Stators of conventional art, for example, include a stator core divided into a plurality of core segments to provide one tooth per core segment with winding applied thereto. Such a stator includes stator components for U phase, V phase, and W phase. Each stator component includes four core segments disposed at 90-degree intervals (termed separated core elements hereinafter), a plurality of insulators provided to the respective separated core elements, and a plurality of windings which are concentrically wound around the respective separated core elements via the insulators and are supplied with currents having the same phase as each other. In each stator component, the plurality of windings are formed of a single conductor wire, and the windings are connected to each other via crossover wire portions which are part of the conductor wire. Furthermore, in each stator component, the plurality of insulators are integrally formed. Specifically, each stator component includes an integrated molded member which includes the insulators and a ring-shaped connecting portion connecting between the insulators. Thus, rigidity of the stator component is secured and the shape of the stator component, as a separate body, is ensured to be stable. Accordingly, stator components can be separately handled with ease.

SUMMARY

In the present disclosure, provided is a stator as the following.

The stator includes a stator core including a plurality of core segments annularly disposed in the circumferential direction. The stator includes a plurality of stator components. Each of the plurality of stator components includes a plurality of separated core elements, a plurality of insulators, and a plurality of windings. In each of the stator components, the plurality of windings are formed of a single conductor wire, with the plurality of windings being connected to each other via a crossover wire portion which is part of the conductor wire. At least one of the plurality of stator components is a first stator component in which the plurality of insulators are separate from each other. The insulators of the first stator component each include a guide groove for guiding a leader led out of a corresponding one of the windings and connected to the crossover wire portion. The guide groove includes an opening in which the leader is inserted in the guide groove in a direction orthogonal to a longitudinal direction of the leader. The guide groove includes, at at least a part of the guide groove in a direction in which the guide groove extends, a retaining portion in which a width of the opening is smaller than a diameter of the leader.

BRIEF DESCRIPTION OF THE DRAWINGS

The aim set forth above and other aims, features, and advantageous effects of the present disclosure will be made clearer by the following detailed description referring to the accompanying drawings. In the drawings.

DETAILED DESCRIPTION OF THE PREFERRED EMBODIMENTS

PTL 1: JP 2013-162726 A

Figure 1:
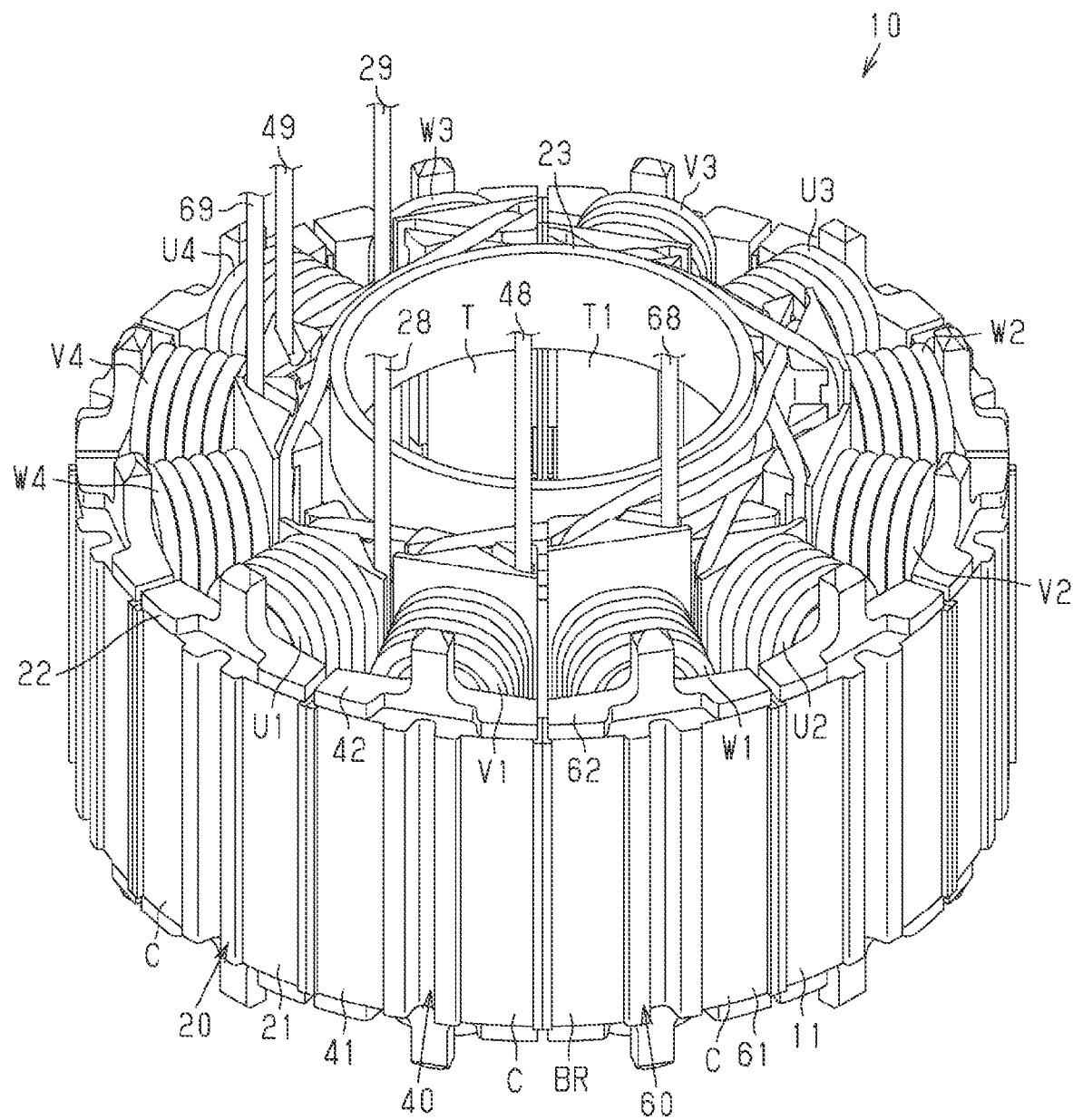
FIG. 1 is a perspective view illustrating a stator according to an embodiment.

In the stator described in PTL 1, the ring-shaped connecting portions of the stator components are disposed being offset in the axial direction, and therefore, there arises an issue of increasing size of the stator in the axial direction. According to the detailed studies conducted by the inventor, the ring-shaped connecting portion may be omitted from at least one of the stator components to solve this issue. However, this means that, in the stator component from which the connecting portion has been omitted, the separated core elements are connected to each other only via the crossover wire portions. The inventor has found an issue that, when such a stator component is separately handled, the positions or the attitudes of the separated core elements cannot be maintained and, consequently, the windings may be unwound and the shape of the windings is not necessarily maintained.

The present disclosure aims to provide a stator which can maintain the shapes of the windings when handling the stator components separately, while preventing size increase of the stator in the axial direction.

In an aspect of the present disclosure, a stator includes a stator core including a plurality of core segments annularly disposed in the circumferential direction. The stator includes a plurality of stator components. Each of the plurality of stator components includes: a plurality of separated core elements that are not adjacent to each other in the circumferential direction, at least two core segments among the plurality of core segments serving as the plurality of separated core elements, a plurality of insulators that are provided to the respective plurality of separated core elements, and a plurality of windings that are concentrically wound around the respective plurality of separated core elements via the corresponding insulators, and are supplied with currents having the same phase as each other. In each of the stator components, the plurality of windings are formed of a single conductor wire, with the plurality of windings being connected to each other via a crossover wire portion which is part of the conductor wire. At least one of the plurality of stator components is a first stator component in which the plurality of insulators are separate from each other. The insulators of the first stator component each include a guide groove for guiding a leader led out of a corresponding one of the windings and connected to the crossover wire portion. The guide groove includes an opening in which the leader is inserted in the guide groove in a direction orthogonal to a longitudinal direction of the leader. the guide groove includes, at at least a part of the guide groove in a direction in which the guide groove extends, a retaining portion in which a width of the opening is smaller than a diameter of the leader.

With the above configuration, even when the insulators individually formed in the first stator component are relatively moved, the leaders of each winding connected to the crossover wire portions are unlikely to be detached from the respective guide grooves by the retaining portions. Thus, the shapes of the windings can be maintained by the retaining portions when separately handling the first stator component, while size increase of the stator in the axial direction can be prevented due to omission of the connecting portion connecting between the plurality of insulators.

Referring to the drawings, an embodiment of a stator will be described. It should be noted that, for the sake of convenience, part of the configurations may be exaggerated or simplified in the drawings. In the drawings, the dimensional ratio of the components is not necessarily to scale.

Figure 2:
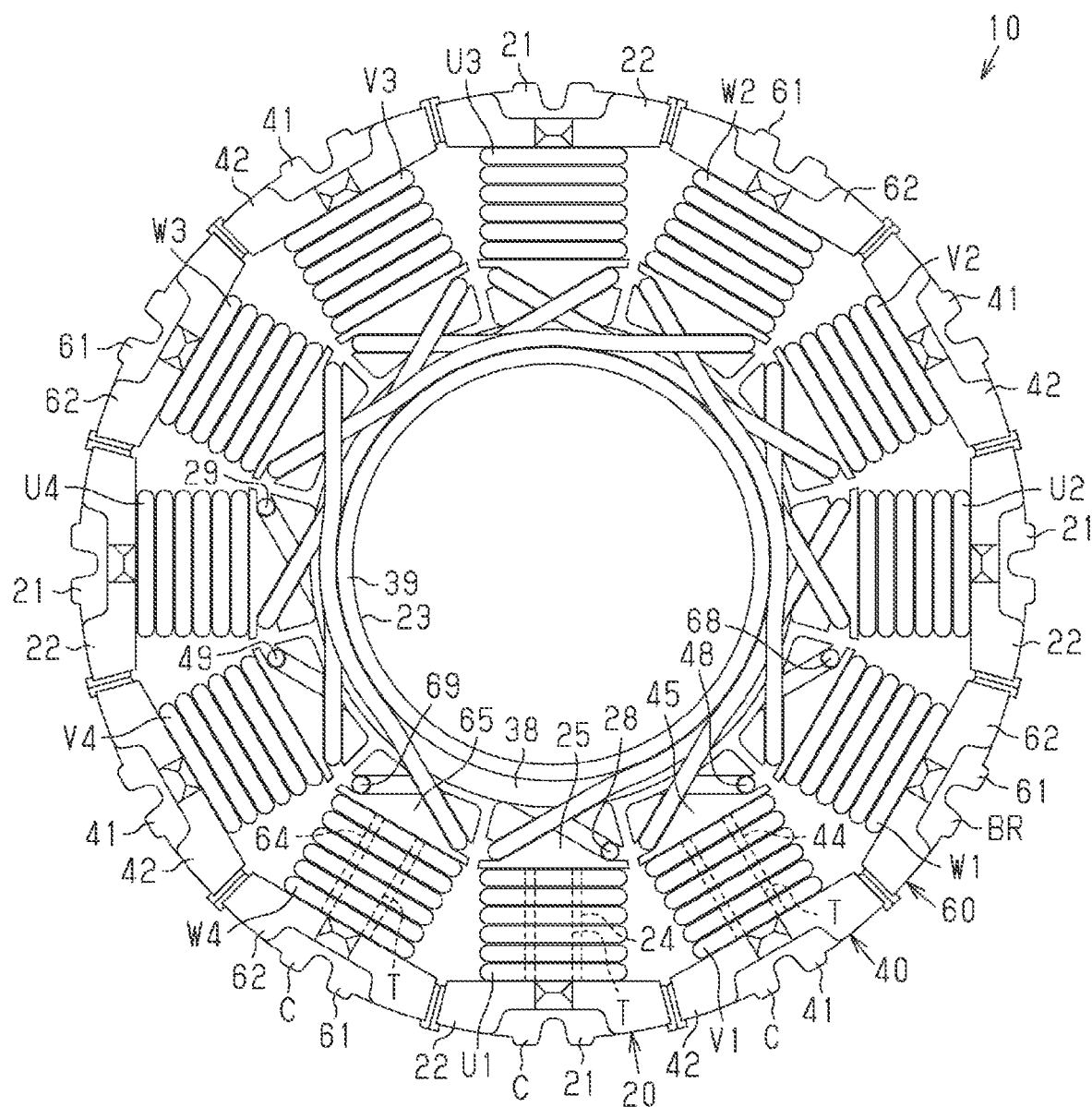
FIG. 2 is a plan view illustrating the stator according to the embodiment.

FIGS. 1 and 2 show a stator 10 according to the present invention used, for example, for an inner-rotor type brushless motor.

The stator 10 includes a stator core 11 having a plurality of teeth T. The stator core 11 has a split structure which is formed of 12 core segments C obtained by splitting the core into 12 in the circumferential direction so that one tooth T is provided per core segment. The core segments C have substantially the same shape. Each core segment C includes one tooth T, and an annular segment BR extending on both sides in the circumferential direction, from the base end side of the tooth T, i.e., from the radially outer side of the tooth T. The tooth T extends from the circumferentially intermediate portion of the annular segment BR toward radially inside of the stator. Furthermore, the teeth T are disposed at substantially 30-degree even intervals in the circumferential direction.

Figure 3:
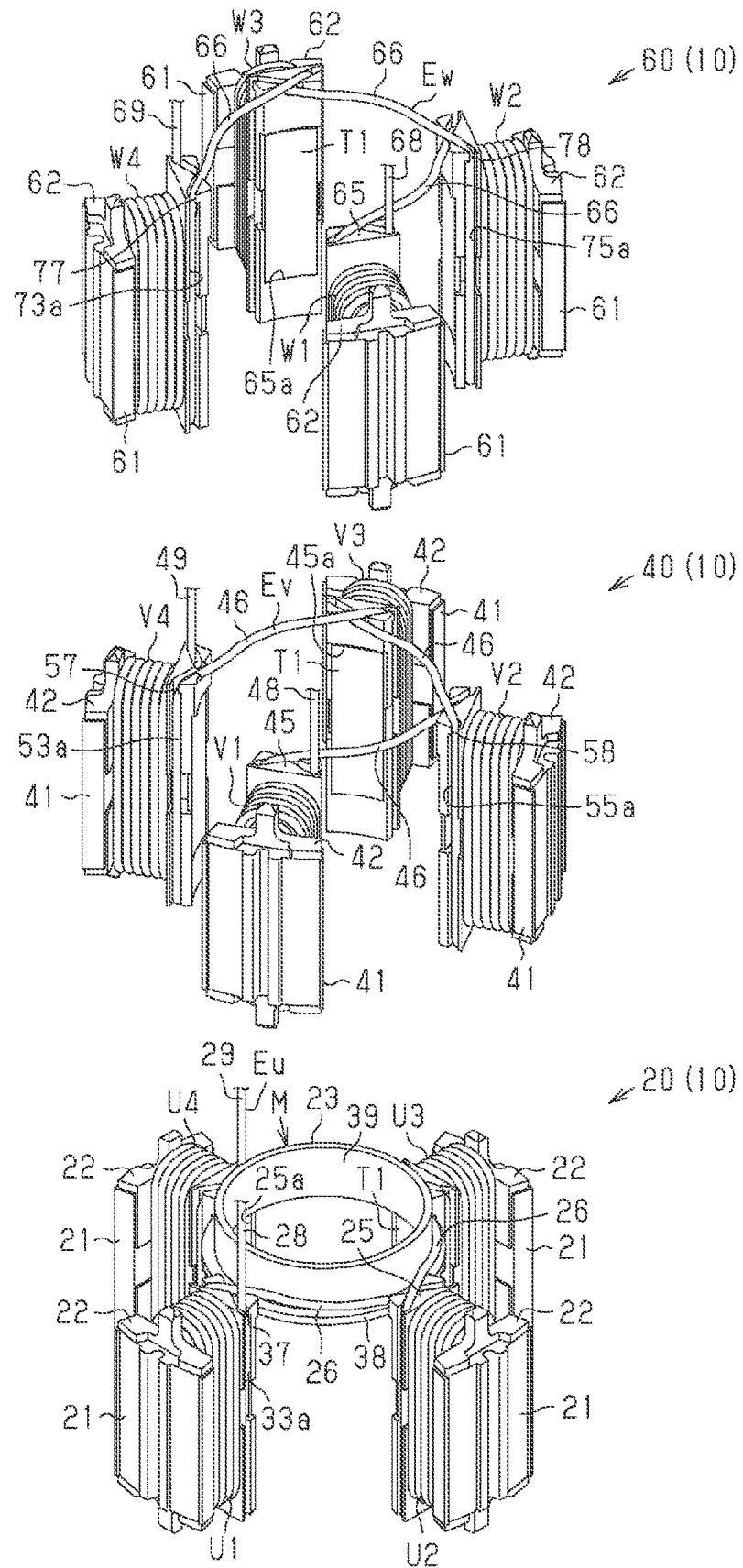
FIG. 3 is an exploded perspective view illustrating the stator according to the embodiment.

As shown in FIG. 3, the stator 10 of the present embodiment includes three stator components 20, 40 and 60. The three stator components 20, 40 and 60 correspond to three phases, i.e., U phase, V phase, and W phase. The stator component corresponding to the phase U is referred to as a U-phase stator component 20, the stator component corresponding to the phase V is referred to as a V-phase stator component 40, and the stator component corresponding to the phase W is referred to as a W-phase stator component 60.

U-Phase Stator Component 20

Figure 4:
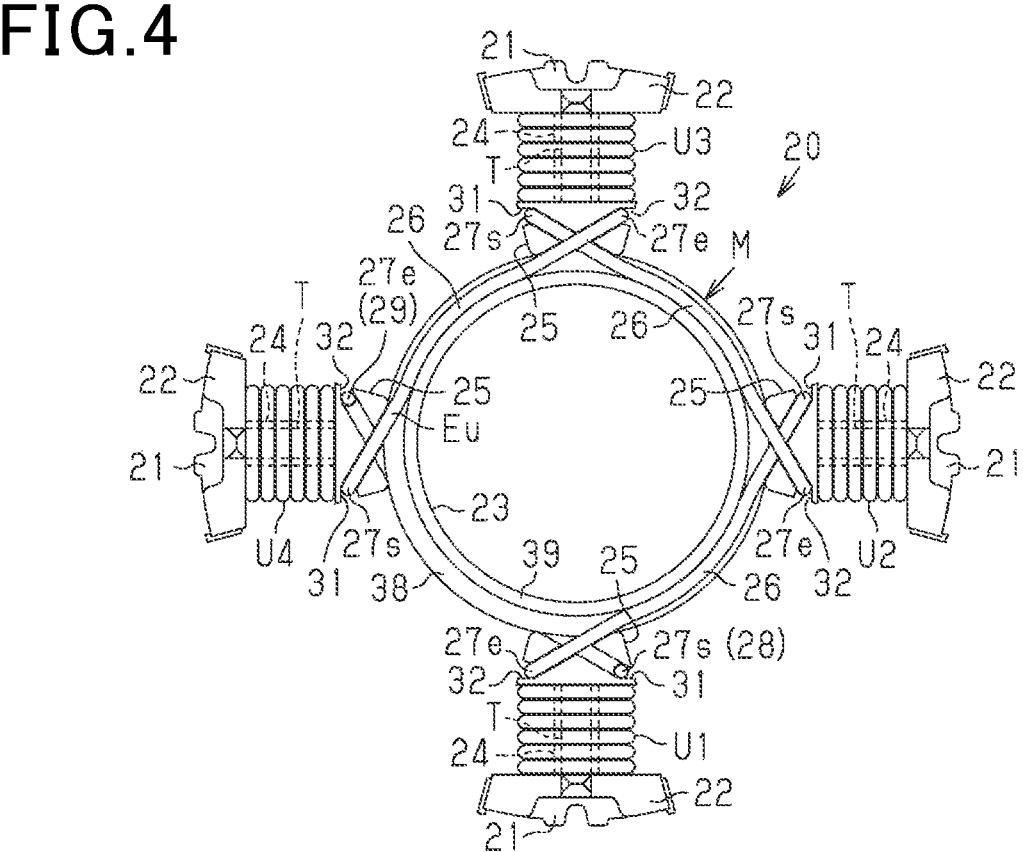
FIG. 4 is a plan view illustrating a U-phase stator component according to the embodiment.

As shown in FIGS. 3 and 4, the U-phase stator component 20 includes four U-phase separated core elements 21, that is, core segments C, disposed at 90-degree intervals in the circumferential direction, U-phase insulators 22 provided to the respective U-phase separated core elements 21, and U-phase windings U1 to U4 concentrically wound around the respective teeth T of the U-phase separated core elements 21 via the insulators 22. The U-phase separated core elements 21 are core segments C which are not adjacent to each other in the circumferential direction. The U-phase insulators 22 electrically insulate the U-phase separated core elements 21 from the U-phase windings U1 to U4.

U-phase currents, i.e., currents having the same phase as each other, are supplied to the U-phase windings U1 to U4 from a drive circuit, such as an inverter circuit, not shown. Furthermore, the U-phase windings U1 to U4 are all wound in the same direction. Specifically, when U-phase currents are supplied to the U-phase windings U1 to U4, the teeth T around which the U-phase windings U1 to U4 are wound will have the same polarity.

The plurality of U-phase insulators 22 have substantially the same shape. Each of the U-phase insulators 22 is formed as part of a integrated molded member M made of a synthetic resin material. Specifically, the integrated molded member M is integrally provided with the plurality of U-phase insulators 22, and an annular connecting portion 23 connecting between the plurality of U-phase insulators 22. In other words, the U-phase stator component 20 is formed as a second stator component provided with the integrated molded member M including the U-phase insulators 22 and the connecting portion 23. It should be noted that the U-phase insulators 22 are assembled and fixed to, or integrally molded with, the respective U-phase separated core elements 21 for integration.

Figure 10:
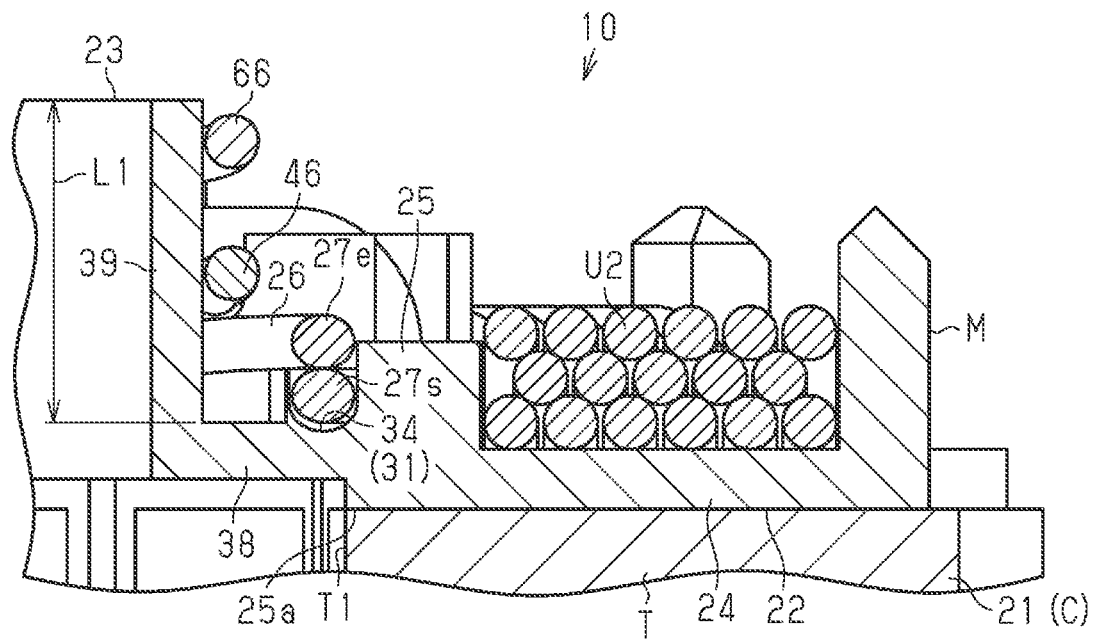
FIG. 10 is a cross-sectional view illustrating a part of the stator according to the embodiment.

As shown in FIGS. 4 and 10, each U-phase insulator 22 includes a wound portion 24 around which a corresponding one of the U-phase windings U1 to U4 is wound, and a flange portion 25 formed at the radially inner end of the wound portion 24. It should be noted that FIG. 10 shows a cross section of the U-phase separated core element 21 and the U-phase insulator 22 corresponding to the second U-phase winding U2.

The wound portion 24 has substantially a tubular shape extending in the radial direction of the stator 10, with the tooth T disposed on the inside thereof. In other words, the wound portion 24 covers both axial end surfaces and both circumferential end surfaces of the tooth T. A corresponding one of the U-phase windings U1 to U4 is wound around the wound portion 24.

The flange portion 25 covers at least part of both axial end surfaces and both circumferential end surfaces of the tooth T at the radially inner end thereof. The flange portion 25 is formed in a large size, extending on both sides in the axial direction and both sides in the circumferential direction with respect to the wound portion 24. Thus, the flange portion 25 of each U-phase insulator 22 abuts against the radially inner end of a corresponding one of the U-phase windings U1 to U4 wound around the wound portion 24. Also, the connecting portion 23 is integrally connected to the flange portion 25 of each U-phase insulator 22.

The tooth T has a radially inner surface T1 which is exposed from an opening 25a formed on a radially inner end surface of the flange portion 25. Thus, the radially inner surface T1 of the tooth T faces the rotor, not shown, in the radial direction.

As shown in FIG. 4, the four U-phase windings U1 to U4 are formed of a single U-phase conductor wire Eu. More specifically, the single U-phase conductor wire Eu is sequentially wound around the teeth T of the four U-phase separated core elements 21 in the circumferential direction to form the U-phase wirings U1 to U4, and three crossover wire portions 26 between the U-phase windings U1 to U4. It should be noted that the U-phase windings U1 to U4 are wound in the order of the U-phase winding U1, U-phase winding U2, U-phase winding U3, and U-phase winding U4. The following description will be given, with the winding start U-phase winding U1 referred to as a first U-phase winding U1, the intermediate U-phase windings U2 and U3 referred to as second and third U-phase windings U2 and U3, and the winding end U-phase winding U4 referred to as a fourth U-phase winding U4.

The U-phase windings U1 to U4 have winding start portions 27s and winding end portions 27e. The winding start portions 27s and the winding end portions 27e are wire portions led out from the bodies of the U-phase windings U1 to U4, i.e., from the portions wound around the respective wound portions 24, toward the flange portions 25 to form leaders of the present embodiment.

The winding start portion 27s of the first U-phase winding U1 is led out in the axial direction to form one terminal wire 28 of the U-phase conductor wire Eu. The winding end portion 27e of the first U-phase winding U1 is connected to the winding start portion 27s of the second U-phase winding U2 via a crossover wire portion 26. The winding end portion 27e of the second U-phase winding U2 is connected to the winding start portion 27s of the third U-phase winding U3 via a crossover wire portion 26. The winding end portion 27e of the third U-phase winding U3 is connected to the winding start portion 27s of the fourth U-phase winding U4 via a crossover wire portion 26. The winding end portion 27e of the fourth U-phase winding U4 is led out in the axial direction similarly to the terminal wire 28 to form the other terminal wire 29 of the U-phase conductor wire Eu. The terminal wires 28 and 29 will be electrically connected to the drive circuit.

The flange portion 25 of each U-phase insulator 22 is provided with a first guide groove 31 for guiding the winding start portion 27s of a corresponding one of the U-phase windings U1 to U4, and a second guide groove 32 for guiding the winding end portion 27e of the corresponding one of the U-phase windings U1 to U4. It should be noted that FIG. 5 shows, as an example, the U-phase insulator 22 corresponding to the first U-phase winding U1, among the U-phase insulators 22.

Figure 5:
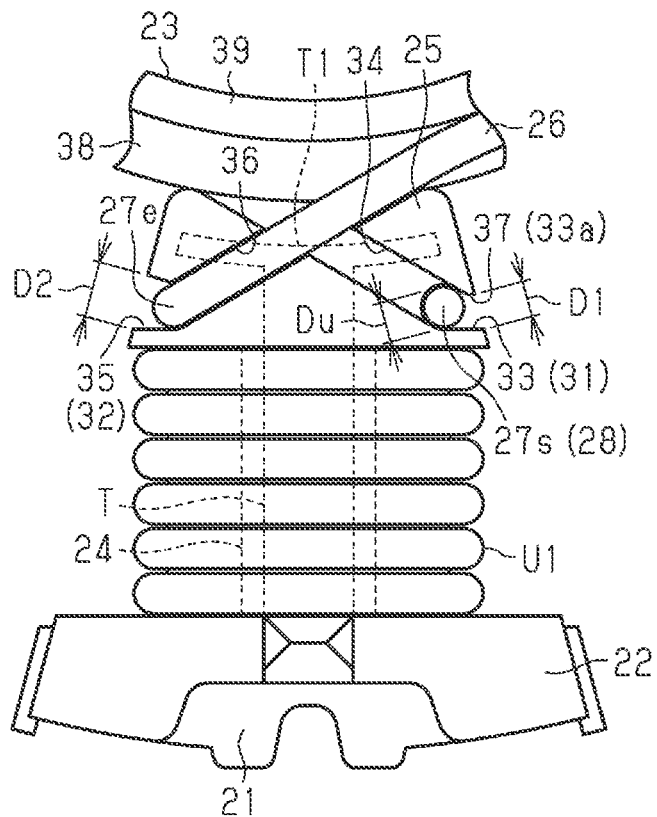
FIG. 5 is an enlarged plan view illustrating a part of the U-phase stator component according to the embodiment.

As shown in FIG. 5, the first guide groove 31 includes a first groove portion 33 formed in the axial direction on the circumferential side surface of the flange portion 25, and a second groove portion 34 formed on one axial end surface of the flange portion 25. The first and second groove portions 33 and 34 are continuous.

The second guide groove 32 includes a first groove portion 35 formed in the axial direction on the circumferential side surface of the flange portion 25 facing away from the first groove portion 33, and a second groove portion 36 formed on the same axial end surface of the flange portion 25 as the second groove portion 34. The first and second groove portions 35 and 36 are continuous.

The second groove portions 34 and 36 are formed so as to intersect each other as viewed in the axial direction. Furthermore, the second groove portions 34 and 36 are formed so as to be located at different positions in the axial direction. Specifically, the second groove portion 36 is formed above the second groove portion 34, i.e., formed at a position further from the tooth T.

As shown in FIGS. 4 and 5, the winding start portion 27s of the first U-phase winding U1 is inserted in the first groove portion 33 of the first guide groove 31, and led out of one axial end of the first groove portion 33 in the axial direction to form the terminal wire 28. The winding end portion 27e of the first U-phase winding U1 is inserted in the first groove portion 35 of the second guide groove 32 to extend through the second groove portion 36 thereof, and led out of the second groove portion 36 toward the second U-phase winding U2 in the circumferential direction.

The winding start portion 27s of the second U-phase winding U2 connected with the winding end portion 27e of the first U-phase winding U1 via the crossover wire portion 26 is inserted in the second groove portion 34 of the first guide groove 31 there to extend through the first groove portion 33 thereof. Then, the winding end portion 27e of the second U-phase winding U2 is inserted in the first groove portion 35 of the second guide groove 32 there to extend through the second groove portion 36 thereof, and led out of the second groove portion 36 toward the third U-phase winding U3 in the circumferential direction. In the second U-phase winding U2, the winding start portion 27s and the winding end portion 27e held in the second groove portions 34 and 36 intersect each other, as viewed in the axial direction, so that the winding end portion 27e is placed above the winding start portion 27s.

The winding start portion 27s of the third U-phase winding U3 connected with the winding end portion 27e of the second U-phase winding U2 via the crossover wire portion 26 is inserted in the second groove portion 34 of the first guide groove 31 there to extend through the first groove portion 33 thereof. Then, the winding end portion 27e of the third U-phase winding U3 is inserted in the first groove portion 35 of the second guide groove 32 there to extend through the second groove portion 36 thereof, and led out of the second groove portion 36 toward the fourth U-phase winding U4 in the circumferential direction. In the third U-phase winding U3, the winding start portion 27s and the winding end portion 27e held in the second groove portions 34 and 36 intersect each other, as viewed in the axial direction, so that the winding end portion 27e is placed above the winding start portion 27s.

The winding start portion 27s of the fourth U-phase winding U4 connected with the winding end portion 27e of the third U-phase winding U3 via the crossover wire portion 26 is inserted in the second groove portion 34 of the first guide groove 31 there to extend through the first groove portion 33 thereof. Then, the winding end portion 27e of the fourth U-phase winding U4 is inserted in the first groove portion 35 of the second guide groove 32, and led out of one axial end of the first groove portion 35 in the axial direction to form the terminal wire 29.

As shown in FIGS. 3 and 5, in the first guide groove 31 of the U-phase insulator 22 corresponding to the first U-phase winding U1, the first groove portion 33 has an opening 33a which is open substantially in the circumferential direction of the stator 10, so that the winding start portion 27s of the first U-phase winding U1 can be inserted in the opening 33a in the direction perpendicular to the longitudinal direction of the winding start portion 27s.

Furthermore, the opening 33a of the first groove portion 33 has a retaining portion 37 for preventing the winding start portion 27s, i.e., the terminal wire 28, of the first U-phase winding U1 from coming off. The retaining portion 37 is a portion having an opening width D1 which is smaller than the diameter of the winding start portion 27s, i.e., a diameter Du of the U-phase conductor wire Eu. The retaining portion 37 of the present embodiment is formed at only one axial end of the first groove portion 33 connected to the second groove portion 34. In other words, the retaining portion 37 is partially formed at the axial end of the first groove portion 33, from which the winding start portion 27s is led out. Also, the retaining portion 37 is positioned radially outside the radially inner surface T1 of the tooth T. It should be noted that, except for the opening width at the retaining portion 37 in the first and second groove portions 33 and 34, the opening width of the first guide groove 31 is formed to be greater than the diameter Du of the U-phase conductor wire Eu.

In the U-phase insulator 22 corresponding to the first U-phase winding U1, the first groove portion 35 of the second guide groove 32 has an opening width D2 which is greater than the diameter Du of the U-phase conductor wire Eu, throughout the first groove portion 35 in the axial direction.

In the U-phase insulators 22 corresponding to the second U-phase winding U2 and the third U-phase winding U3, the first groove portions 33 and 35 of the first and second guide grooves 31 and 32 have respective opening widths greater than the diameter Du of the U-phase conductor wire Eu throughout the respective first groove portions 33, 35 in the axial direction.

In the U-phase insulator 22 corresponding to the fourth U-phase winding U4, a retaining portion 37 similar to the above is formed at the opening of the first groove portion 35 of the second guide groove 32. The retaining portion 37 of this U-phase insulator 22 prevents the winding end portion 27e, i.e., the terminal wire 29, of the fourth U-phase winding from coming off.

As shown in FIGS. 3 and 4, in the integrated molded member M, the connecting portion 23 connecting between the flange portions 25 of the U-phase insulators 22 includes a base portion 38 having substantially an annular plate shape perpendicular to the axial direction, and an extended portion 39 having substantially a cylindrical shape extending in the axial direction from the radially inner end of the base portion 38. The base portion 38 is positioned radially inside the flange portions 25 and integrally connected to the flange portions 25 in the vicinity of the axial end thereof. The extended portion 39 extends in the axial direction so as to be further from the U-phase separated core elements 21. The connecting portion 23 is formed so that the base portion 38 and the extended portion 39 form an L-shaped cross section.

V-Phase Stator Component 40

Figure 6:
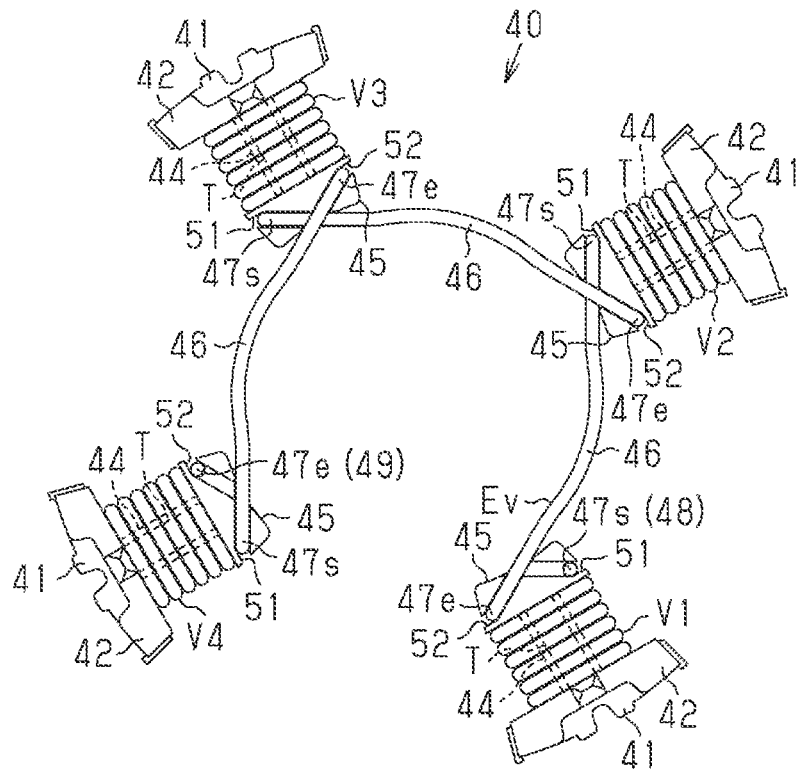
FIG. 6 is a plan view illustrating a V-phase stator component according to the embodiment.

As shown in FIGS. 3 and 6, the V-phase stator component 40 has a configuration in which the connecting portion 23 is omitted from the U-phase stator component 20 described above.

Specifically, the V-phase stator component 40 includes four V-phase separated core elements 41, that is, core segments C, disposed at 90-degree intervals in the circumferential direction, V-phase insulators 42 provided to the respective V-phase separated core elements 41, and V-phase windings V1 to V4 concentrically wound around the respective teeth T of the V-phase separated core elements 41 via the V-phase insulators 42. The V-phase separated core elements 41 are core segments C which are not adjacent to each other in the circumferential direction. The V-phase insulators 42 electrically insulate the V-phase separated core elements 41 from the V-phase windings V1 to V4.

V-phase currents, i.e., currents having the same phase as each other, are supplied to the V-phase windings V1 to V4 from the drive circuit mentioned above. Furthermore, the V-phase windings V1 to V4 are all wound in the same direction. Specifically, when V-phase currents are supplied to the V-phase windings V1 to V4, the teeth T around which the V-phase windings V1 to V4 are wound will have the same polarity.

The plurality of V-phase insulators 42 have substantially the same shape. The plurality of V-phase insulators 42 are made of a synthetic resin material and individually formed. In other words, the V-phase stator component 40 is formed as a first stator component in which the four V-phase insulators 42 are separate from each other. It should be noted that the V-phase insulators 42 are assembled and fixed to or integrally molded with the corresponding V-phase separated core elements 41 for integration.

As shown in FIG. 6, each of the V-phase insulators 42 includes a wound portion 44 around which a corresponding one of the V-phase windings V1 to V4 is wound, and a flange portion 45 formed at the radially inner end of the wound portion 44.

The wound portion 44 has substantially a tubular shape extending in the radial direction of the stator 10, with the tooth T disposed on the inside thereof. In other words, the wound portion 44 covers both axial end surfaces and both circumferential end surfaces of the tooth T. A corresponding one of the V-phase windings V1 to V4 is wound around the wound portion 44.

The flange portion 45 covers at least a part of both axial end surfaces and both circumferential end surfaces of the tooth T at the radially inner end thereof. The flange portion 45 is formed in a large size, extending on both sides in the axial direction and both sides in the circumferential direction with respect to the wound portion 44. Thus, the flange portion 45 abuts against the radially inner end of a corresponding one of the V-phase windings V1 to V4 wound around the wound portion 44.

The tooth T has a radially inner surface T1 which is exposed from an opening 45a formed on a radially inner end surface of the flange portion 45. Thus, the radially inner surface T1 of the tooth T faces the rotor, not shown, in the radial direction.

The four V-phase windings V1 to V4 are formed of a single V-phase conductor wire Ev. More specifically, the single V-phase conductor wire Ev is sequentially wound around the teeth T of the plurality of V-phase separated core elements 41 in the circumferential direction to form the V-phase wirings V1 to V4, and three crossover wire portions 46 between the V-phase windings V1 to V4. It should be noted that the V-phase windings V1 to V4 are wound in the order of the V-phase winding V1, the V-phase winding V2, the V-phase winding V3, and the V-phase winding V4. The following description will be given with the winding start V-phase winding V1 referred to as a first V-phase winding V1, the winding end V-phase winding V4 referred to as a fourth V-phase winding V4, and the intermediate V-phase windings V2 and V3 referred to as second and third V-phase windings V2 and V3.

The V-phase windings V1 to V4 have winding start portions 47s and winding end portions 47e. The winding start portions 47s and the winding end portions 47e are wire portions led out from the bodies of the V-phase windings V1 to V4, i.e., from the portions wound around the respective wound portions 44, toward the flange portions 45 to form leaders of the present embodiment.

The winding start portion 47s of the first V-phase winding V1 is led out in the axial direction to form one terminal wire 48 of the V-phase conductor wire Ev. The winding end portion 47e of the first V-phase winding V1 is connected to the winding start portion 47s of the second V-phase winding V2 via a crossover wire portion 46. The winding end portion 47e of the second V-phase winding V2 is connected to the winding start portion 47s of the third V-phase winding V3 via a crossover wire portion 46. The winding end portion 47e of the third V-phase winding V3 is connected to the winding start portion 47s of the fourth V-phase winding V4 via a crossover wire portion 46. The winding end portion 47e of the fourth V-phase winding V4 is led out in the axial direction to form the other terminal wire 49 of the V-phase conductor wire Ev. The terminal wires 48 and 49 will be electrically connected to the drive circuit mentioned above.

The flange portion 45 of each V-phase insulator 42 is provided with a first guide groove 51 for guiding the winding start portion 47s of a corresponding one of the V-phase windings V1 to V4, and a second guide groove 52 for guiding the winding end portion 47e of the corresponding one of the V-phase windings V1 to V4. It should be noted that FIG. 7 shows, as an example, the V-phase insulator 42 corresponding to the second V-phase winding V2, among the plurality of V-phase insulators 42.

Figure 7:
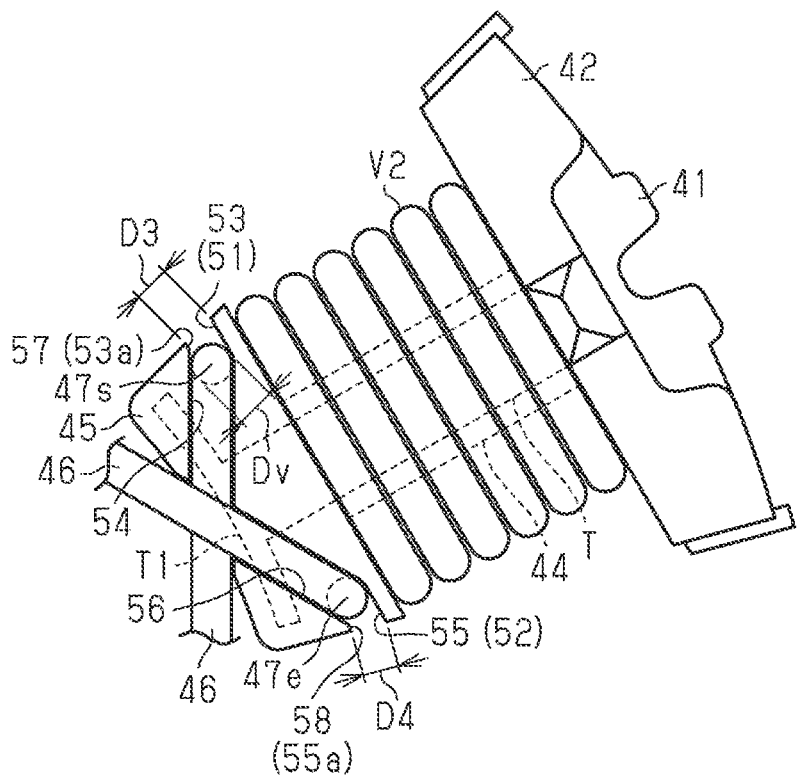
FIG. 7 is an enlarged plan view illustrating a part of the V-phase stator component according to the embodiment.

As shown in FIG. 7, the first guide groove 51 includes a first groove portion 53 formed in the axial direction on the circumferential side surface of the flange portion 45, and a second groove portion 54 formed on one axial end surface of the flange portion 45. The first and second groove portions 53 and 54 are continuous.

The second guide groove 52 includes a first groove portion 55 formed in the axial direction on the circumferential side surface of the flange portion 45 facing away from the first groove portion 53, and a second groove portion 56 formed on the same axial end surface of the flange portion 45 as the second groove portion 54. The first and second groove portions 55 and 56 are continuous. The second groove portions 54 and 56 are formed so as to intersect each other as viewed in the axial direction.

The winding start portion 47s of the first V-phase winding V1 is inserted in the first groove portion 53 of the first guide groove 51, and led out of one axial end of the first groove portion 53 in the axial direction to form the terminal wire 48. The winding end portion 47e of the first V-phase winding V1 is inserted in the first groove portion 55 of the second guide groove 52 to extend through the second groove portion 56 thereof, and led out of the second groove portion 56 toward the second V-phase winding V2 in the circumferential direction.

The winding start portion 47s of the second V-phase winding V2 connected with the winding end portion 47e of the first V-phase winding V1 via the crossover wire portion 46 is inserted in the second groove portion 54 of the first guide groove 51 there to extend through the first groove portion 53 thereof. The winding end portion 47e of the second V-phase winding V2 is inserted in the first groove portion 55 of the second guide groove 52 to extend through the second groove portion 56 thereof, and led out of the second groove portion 56 toward the third V-phase winding V3 in the circumferential direction. In the second V-phase winding V2, the winding start portion 47s and the winding end portion 47e held in the second groove portions 54 and 56 intersect each other, as viewed in the axial direction, so that the winding end portion 47e is placed above the winding start portion 47s.

The winding start portion 47s of the third V-phase winding V3 connected with the winding end portion 47e of the second V-phase winding V2 via the crossover wire portion 46 is inserted in the second groove portion 54 of the first guide groove 51 there to extend through the first groove portion 53 thereof. The winding end portion 47e of the third V-phase winding V3 is inserted in the first groove portion 55 of the second guide groove 52 to extend through the second groove portion 56 thereof, and led out of the second groove portion 56 toward the fourth V-phase winding V4 in the circumferential direction. In the third V-phase winding V3, the winding start portion 47s and the winding end portion 47e held in the second groove portions 54 and 56 intersect each other, as viewed in the axial direction, so that the winding end portion 47e is placed above the winding start portion 47s.

The winding start portion 47s of the fourth V-phase winding V4 connected with the winding end portion 47e of the third V-phase winding V3 via the crossover wire portion 46 is inserted in the second groove portion 54 of the first guide groove 51 there to extend through the first groove portion 53 thereof. Then, the winding end portion 47e of the fourth V-phase winding V4 is inserted in the first groove portion 55 of the second guide groove 52, and led out of one axial end of the first groove portion 55 in the axial direction to form the terminal wire 49.

Retaining Portion of V-Phase Stator Component

As shown in FIGS. 3 and 7, in the first guide groove 51 of each flange portion 45, the first groove portion 53 has an opening 53a which is open substantially in the circumferential direction of the stator 10, so that the winding start portion 47s of a corresponding one of the V-phase windings V1 to V4 can be inserted in the opening 53a in the direction perpendicular to the longitudinal direction of the winding start portion 47s.

Furthermore, the opening 53a of the first groove portion 53 in each first guide groove 51 has a retaining portion 57 for preventing the winding start portion 47s of a corresponding one of the V-phase windings V1 to V4 from coming off. The retaining portion 57 is a portion where an opening width D3 is smaller than the diameter of the winding start portion 47s, i.e., a diameter Dv of the V-phase conductor wire Ev. The retaining portion 57 of the present embodiment is formed at only one axial end of the first groove portion 53 connected to the second groove portion 54. In other words, the retaining portion 57 is partially formed at the axial end of the first groove portion 53, from which the winding start portion 47s is led out, i.e., the axial end on the side where the crossover wire portion 46 is disposed. Also, the retaining portion 57 is positioned radially outside the radially inner surface T1 of the tooth T. It should be noted that, except for the opening width at the retaining portion 57 in the first and second groove portions 53 and 54, the opening width of the first guide groove 51 is formed to be greater than the diameter Dv of the V-phase conductor wire Ev.

Similarly, in the second guide groove 52 of each flange portion 45, the first groove portion 55 has an opening 55a which is open substantially in the circumferential direction of the stator 10, so that the winding end portion 47e of a corresponding one of the V-phase windings V1 to V4 can be inserted in the opening 55a in the direction perpendicular to the longitudinal direction of the winding end portion 47e.

Furthermore, the opening 55a of the first groove portion 55 in each second guide groove 52 has a retaining portion 58 for preventing the winding end portion 47e of a corresponding one of the V-phase windings V1 to V4 from coming off. The retaining portion 58 is a portion having an opening width D4 which is smaller than the diameter of the winding end portion 47e, i.e., the diameter Dv of the V-phase conductor wire Ev. The retaining portion 58 of the present embodiment is formed at only one axial end of the first groove portion 55 connected to the second groove portion 56. In other words, the retaining portion 58 is partially formed at the axial end of the first groove portion 55, from which the winding end portion 47e is led out, i.e., the axial end on the side where the crossover wire portion 46 is disposed. Also, the retaining portion 58 is positioned radially outside the radially inner surface T1 of the tooth T. It should be noted that, except for the opening width at the retaining portion 58 in the first and second groove portions 55 and 56, the opening width of the second guide groove 52 is formed to be greater than the diameter Dv of the V-phase conductor wire Ev.

W-Phase Stator Component 60

Figure 8:
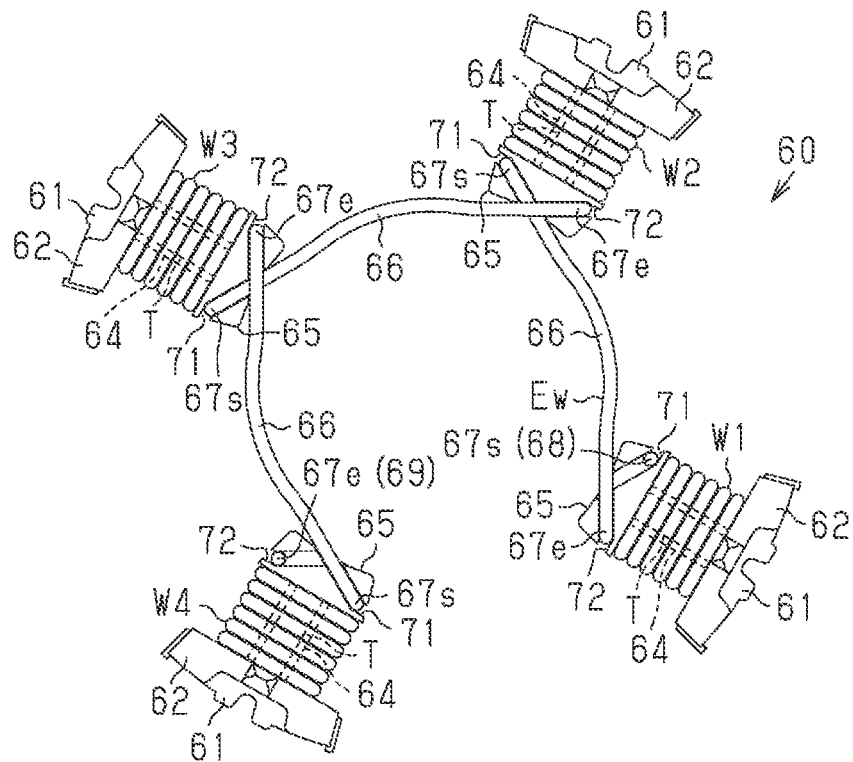
FIG. 8 is a plan view illustrating a W-phase stator component according to the embodiment.

As shown in FIGS. 3 and 8, the W-phase stator component 60 has a configuration which is substantially similar to that of the V-phase stator component 40.

Specifically, the W-phase stator component 60 includes four W-phase separated core elements 61, that is, core segments C, disposed at 90-degree intervals in the circumferential direction, W-phase insulators 62 provided to the respective W-phase separated core elements 61, and W-phase windings W1 to W4 concentrically wound around the teeth T of the respective W-phase separated core elements 61 via the insulators 62. The four W-phase separated core elements 61 are core segments C which are not adjacent to each other in the circumferential direction. The W-phase insulators 62 electrically insulate the W-phase separated core elements 61 from the W-phase windings W1 to W4.

W-phase currents, i.e., currents having the same phase as each other, are supplied to the W-phase windings W1 to W4 from the drive circuit mentioned above. Furthermore, the W-phase windings W1 to W4 are all wound in the same direction. Specifically, when W-phase currents are supplied to the W-phase windings W1 to W4, the teeth T around which the W-phase windings W1 to W4 are wound will have the same polarity.

The plurality of W-phase insulators 62 have substantially the same shape. The plurality of W-phase insulators 62 are made of a synthetic resin material and individually formed. In other words, the W-phase stator component 60 is formed as a first stator component in which the four W-phase insulators 62 are separate from each other. It should be noted that the W-phase insulators 62 are assembled and fixed to or integrally molded with the corresponding W-phase separated core elements 61 for integration.

As shown in FIG. 8, each W-phase insulator 62 includes a wound portion 64 around which a corresponding one of the W-phase windings W1 to W4 is wound, and a flange portion 65 formed at the radially inner end of the wound portion 64.

The wound portion 64 has substantially a tubular shape extending in the radial direction of the stator 10, with the tooth T disposed on the inside thereof. In other words, the wound portion 64 covers both axial end surfaces and both circumferential end surfaces of the tooth T. A corresponding one of the W-phase windings W1 to W4 is wound around the wound portion 64.

The flange portion 65 covers at least part of both axial end surfaces and both circumferential end surfaces of the tooth T at the radially inner end thereof. The flange portion 65 is formed in a large size, extending on both sides in the axial direction and both sides in the circumferential direction with respect to the wound portion 64. Thus, the flange portion 65 abuts against the radially inner end of a corresponding one of the W-phase windings W1 to W4 wound around the wound portion 64.

The tooth T has a radially inner surface T1 which is exposed from an opening 65a formed on a radially inner end surface of the flange portion 65. Thus, the radially inner surface T1 of the tooth T faces the rotor, not shown, in the radial direction.

The four W-phase windings W1 to W4 are formed of a single W-phase conductor wire Ew. More specifically, the single W-phase conductor wire Ew is sequentially wound around the teeth T of the four W-phase separated core elements 61 in the circumferential direction to form the W-phase wirings W1 to W4, and three crossover wire portions 66 between the W-phase windings W1 to W4. It should be noted that the W-phase windings W1 to W4 are wound in the order of the W-phase winding W1, the W-phase winding W2, the W-phase winding W3, and the W-phase winding W4. The following description will be given, with the winding start W-phase winding W1 referred to as a first W-phase winding W1, the winding end W-phase winding W4 referred to as a fourth W-phase winding W4, and the intermediate W-phase windings W2 and W3 referred to as second and third W-phase windings W2 and W3.

The W-phase windings W1 to W4 have winding start portions 67s and winding end portions 67e. The winding start portions 67s and the winding end portions 67e are wire portions led out from the bodies of the W-phase windings W1 to W4, i.e., from the portions wound around the respective wound portions 64, toward the flange portions 65 to form leaders of the present embodiment.

The winding start portion 67s of the first W-phase winding W1 is led out in the axial direction to form one terminal wire 68 of the W-phase conductor wire Ew. The winding end portion 67e of the first W-phase winding W1 is connected to the winding start portion 67s of the second W-phase winding W2 via a crossover wire portion 66. The winding end portion 67e of the second W-phase winding W2 is connected to the winding start portion 67s of the third W-phase winding W3 via a crossover wire portion 66. The winding end portion 67e of the third W-phase winding W3 is connected to the winding start portion 67s of the fourth W-phase winding W4 via a crossover wire portion 66. The winding end portion 67e of the fourth W-phase winding W4 is led out in the axial direction to form the other terminal wire 69 of the W-phase conductor wire Ew. The terminal wires 68 and 69 will be electrically connected to the drive circuit mentioned above.

The flange portion 65 of each W-phase insulator 62 is provided with a first guide groove 71 for guiding the winding start portion 67s of a corresponding one of the W-phase windings W1 to W4, and a second guide groove 72 for guiding the winding end portion 67e of the corresponding one of the W-phase windings W1 to W4. It should be noted that FIG. 9 shows, as an example, the W-phase insulator 62 corresponding to the second W-phase winding W2, among the W-phase insulators 62.

Figure 9:
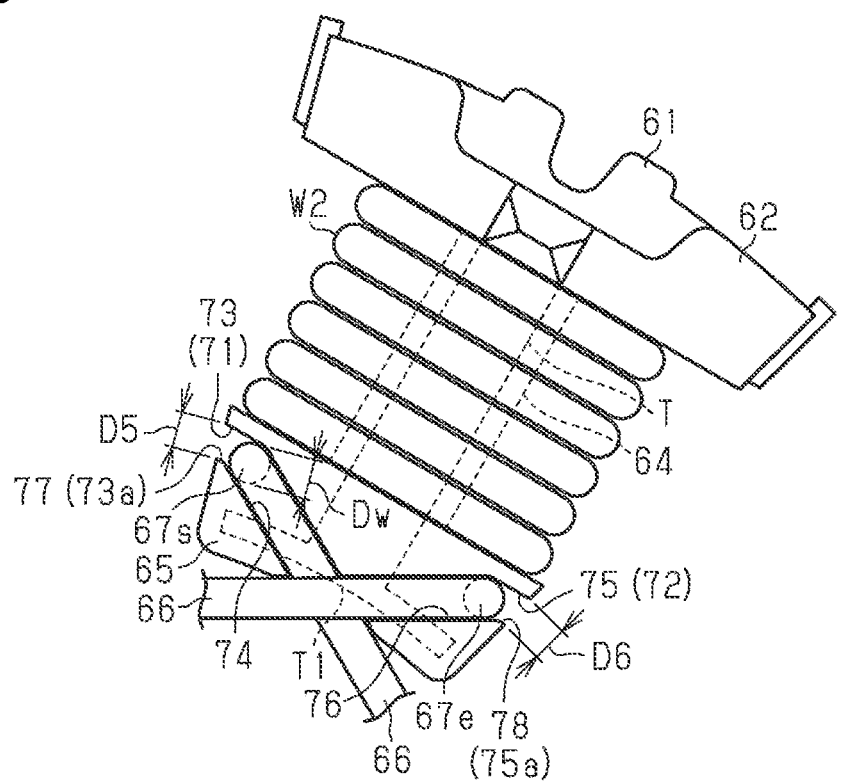
FIG. 9 is an enlarged plan view illustrating a part of the W-phase stator component according to the embodiment.

As shown in FIG. 9, the first guide groove 71 includes a first groove portion 73 formed in the axial direction on the circumferential side surface of the flange portion 65, and a second groove portion 74 formed on one axial end surface of the flange portion 65. The first and second groove portions 73 and 74 are continuous.

The second guide groove 72 includes a first groove portion 75 formed in the axial direction on the circumferential side surface of the flange portion 65 facing away from the first groove portion 73, and a second groove portion 76 formed on the same axial end surface of the flange portion 65 as the second groove portion 74. The first and second groove portions 75 and 76 are continuous. The second groove portions 74 and 76 are formed so as to intersect each other as viewed in the axial direction.

The winding start portion 67s of the first W-phase winding W1 is inserted in the first groove portion 73 of the first guide groove 71, and led out of one axial end of the first groove portion 73 in the axial direction to form the terminal wire 68. The winding end portion 67e of the first W-phase winding W1 is inserted in the first groove portion 75 of the second guide groove 72 to extend through the second groove portion 76 thereof, and led out of the second groove portion 76 toward the second W-phase winding W2 in the circumferential direction.

The winding start portion 67s of the second W-phase winding W2 connected with the winding end portion 67e of the first W-phase winding W1 via the crossover wire portion 66 is inserted in the second groove portion 74 of the first guide groove 71 there to extend through the first groove portion 73 thereof. The winding end portion 67e of the second W-phase winding W2 is inserted in the first groove portion 75 of the second guide groove 72 to extend through the second groove portion 76 thereof, and led out of the second groove portion 76 toward the third W-phase winding W3 in the circumferential direction. In the second W-phase winding W2, the winding start portion 67s and the winding end portion 67e held in the second groove portions 74 and 76 intersect each other, as viewed in the axial direction, so that the winding end portion 67e is placed above the winding start portion 67s.

The winding start portion 67s of the third W-phase winding W3 connected with the winding end portion 67e of the second W-phase winding W2 via the crossover wire portion 66 is inserted in the second groove portion 74 of the first guide groove 71 there to extend through the first groove portion 73 thereof. The winding end portion 67e of the third W-phase winding W3 is inserted in the first groove portion 75 of the second guide groove 72 to extend through the second groove portion 76 thereof, and led out of the second groove portion 76 toward the fourth W-phase winding W4 in the circumferential direction. In the third W-phase winding W3, the winding start portion 67s and the winding end portion 67e held in the second groove portions 74 and 76 intersect each other, as viewed in the axial direction, so that the winding end portion 67e is placed above the winding start portion 67s.

The winding start portion 67s of the fourth W-phase winding W4 connected with the winding end portion 67e of the third W-phase winding W3 via the crossover wire portion 66 is inserted in the second groove portion 74 of the first guide groove 71 there to extend through the first groove portion 73 thereof. Then, the winding end portion 67e of the fourth W-phase winding W4 is inserted in the first groove portion 75 of the second guide groove 72, and led out of one axial end of the first groove portion 75 in the axial direction to form the terminal wire 69.

Retaining Portion of W-Phase Stator Component

As shown in FIGS. 3 and 9, in the first guide groove 71 of each flange portion 65, the first groove portion 73 has an opening 73a which is open substantially in the circumferential direction of the stator 10, so that the winding start portion 67s of a corresponding one of the W-phase windings W1 to W4 can be inserted in the opening 73a in the direction perpendicular to the longitudinal direction of the winding start portion 67s.

Furthermore, the opening 73a of the first groove portion 73 in each first guide groove 71 has a retaining portion 77 for preventing the winding start portion 67s of a corresponding one of the W-phase windings W1 to W4 from coming off. The retaining portion 77 is a portion having an opening width D5 which is smaller than the diameter of the winding start portion 67s, i.e., a diameter Dw of the W-phase conductor wire Ew. The retaining portion 77 of the present embodiment is formed at only one axial end of the first groove portion 73 connected to the second groove portion 74. In other words, the retaining portion 77 is partially formed at the axial end of the first groove portion 73, from which the winding start portion 67s is led out, i.e., the axial end on the side where the crossover wire portion 66 is disposed. Also, the retaining portion 77 is positioned radially outside the radially inner surface T1 of the tooth T. It should be noted that, except for the opening width at the retaining portion 77 in the first and second groove portions 73 and 74, the opening width of the first guide groove 71 is formed to be greater than the diameter Dw of the W-phase conductor wire Ew.

Similarly, in the second guide groove 72 of each flange portion 65, the first groove portion 75 has an opening 75a which is open substantially in the circumferential direction of the stator 10, so that the winding end portion 67e of a corresponding one of the W-phase windings W1 to W4 can be inserted in the opening 75a in the direction perpendicular to the longitudinal direction of the winding end portion 67e.

Furthermore, the opening 75a of the first groove portion 75 in each second guide groove 72 has a retaining portion 78 for preventing the winding end portion 67e of a corresponding one of the W-phase windings W1 to W4 from coming off. The retaining portion 78 is a portion having an opening width D6 which is smaller than the diameter of the winding end portion 67e, i.e., the diameter Dw of the W-phase conductor wire Ew. The retaining portion 78 of the present embodiment is formed at only one axial end of the first groove portion 75 connected to the second groove portion 76. In other words, the retaining portion 78 is partially formed at the axial end of the first groove portion 75, from which the winding end portion 67e is led out, i.e., the axial end on the side where the crossover wire portion 66 is disposed. Also, the retaining portion 78 is positioned radially outside the radially inner surface T1 of the tooth T. It should be noted that, except for the opening width at the retaining portion 78 in the first and second groove portions 75 and 76, the opening width of the second guide groove 72 is formed to be greater than the diameter Dw of the W-phase conductor wire Ew.

The U-phase stator component 20, the V-phase stator component 40, and the W-phase stator component 60 formed as described above are assembled in the axial direction.

As shown in FIG. 2, the windings of the stator 10 of the present embodiment are disposed along one direction (counterclockwise in FIG. 2) of the circumferential direction in the order of the U-phase winding U1, V-phase winding V1, W-phase winding W1, U-phase winding U2, V-phase winding V2, W-phase winding W2, U-phase winding U3, V-phase winding V3, W-phase winding W3, U-phase winding U4, V-phase winding V4, and W-phase winding W4.

In the U-, V- and W-phase stator components 20, 40 and 60 in an assembled state, the insulators 22, 42 and 62 adjacent to each other in the circumferential direction are ensured to be separated from each other with a gap therebetween. Furthermore, the V-phase insulators 42 and the W-phase stators 62 are ensured to be separated from the connecting portion 23 of the U-phase stator component 20 in the radial direction via a gap. With this configuration, the insulators 22, 42 and 62 are less likely to interfere with each other when assembled, thereby contributing to improving assembling workability.

The crossover wire portions 26, 46 and 66 of the stator components 20, 40 and 60 are disposed axially above the base portion 38 of the connecting portion 23 and radially outside the extended portion 39 thereof. In other words, the crossover wire portions 26, 46 and 66 formed in the stator 10 are all disposed on one side in the axial direction.

As shown in FIG. 10, the extended portion 39 has an axial length L1 from the base portion 38, which is substantially the same height as the height in which two wire segments of each of U-, V- and W-phase conductor wires Eu, Ev and Ew are stacked in the axial direction. It should be noted that the U-, V- and W-phase conductor wires Eu, Ev and Ew have the same diameter.

Figure 11:
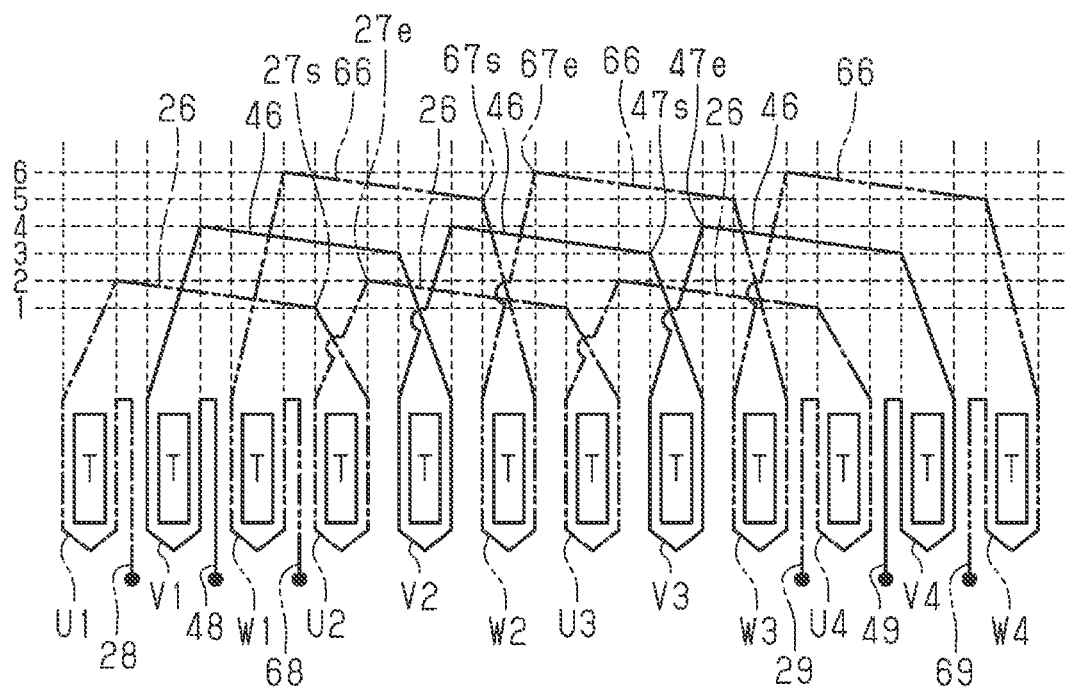
FIG. 11 is a connection diagram illustrating windings of the stator according to the embodiment.

FIG. 11 shows a connection mode of the U-phase wirings U1 to U4, V-phase wirings V1 to V4, and W-phase wirings W1 to W4.

The numbers 1 to 6 indicate axial positions of the crossover wire portions 26, 46 and 66. The smaller the number is, the closer the crossover wire portions are positioned to the base portion 38 of the connecting portion 23, i.e., to the teeth T, in the axial direction, and the larger the number is, the more separated they are from the base portion 38 of the connecting portion 23, i.e., from the teeth T, in the axial direction. In the following description, the crossover wire portions will be expressed as a first layer, second layer, . . . , fifth layer, and sixth layer in order from the one with the closest position of the crossover wire portions to the teeth T in the axial direction. It should also be noted that each layer corresponds to the diameter of one U-phase conductor wire Eu, or one V-phase conductor wire Ev, or one W-phase conductor wire Ew.

The crossover wire portions 26 of the U-phase windings U1 to U4 are disposed at positions closest to the teeth T in the axial direction. Furthermore, the winding start portions 27s of the U-phase windings U1 to U4 are disposed at the first layer, and the winding end portions 27e of the U-phase windings U1 to U4 are disposed at the second layer.

The crossover wire portions 66 of the W-phase windings W1 to W4 are disposed at positions furthest from the teeth T in the axial direction. Furthermore, the winding start portions 67s of the W-phase windings W1 to W4 are disposed at the fifth layer, and the winding end portions 67e of the W-phase windings W1 to W4 are disposed at the sixth layer.

The crossover wire portions 46 of the V-phase windings V1 to V4 are disposed between the U-phase crossover wire portions 26 and the W-phase crossover wire portions 66. Furthermore, the winding start portions 47s of the V-phase windings V1 to V4 are disposed at the third layer, and the winding end portions 47e of the V-phase windings V1 to V4 are disposed at the fourth layer. The connection mode described above can prevent interference between the crossover wire portions 26, 46 and 66.

Next, a method of producing the stator 10 having the above configuration will be described.

First, in the U-phase stator component 20, the U-phase separated core elements 21 are integrated with the respective U-phase insulators 22. Then, in the V-phase stator component 40, the V-phase separated core elements 41 are integrated with the respective V-phase insulators 42. Also, in the W-phase stator component 60, the W-phase separated core elements 61 are integrated with the respective W-phase insulators 62.

Subsequently, U-phase windings U1 to U4 are wound, from radially outside, around the respective wound portions 24 of the U-phase insulators 22 integrated with the U-phase separated core elements 21, using a flyer, not shown. In this case, the U-phase windings U1 to U4 are formed using a single U-phase conductor wire Eu, with crossover wire portions 26 formed between the U-phase windings U1 to U4. The crossover wire portions 26 are disposed along the connecting portion 23, i.e., axially above the base portion 38, and radially outside the extended portion 39. With the mode described above, a U-phase stator component 20 is completed.

Similarly, V-phase windings V1 to V4 are wound, from radially outside, around the respective wound portions 44 of the V-phase insulators 42 integrated with the V-phase separated core elements 41, using the flyer. In this case, the V-phase windings V1 to V4 are formed using a single V-phase conductor wire Ev, with crossover wire portions 46 formed between the V-phase windings V1 to V4. With the mode described above, a V-phase stator component 40 is completed.

Similarly, W-phase windings W1 to W4 are wound, from radially outside, around the respective wound portions 64 of the W-phase insulators 62 integrated with the W-phase separated core elements 61, using the flyer. In this case, the W-phase windings W1 to W4 are formed using a single W-phase conductor wire Ew, with crossover wire portions 66 formed between the W-phase windings W1 to W4. With the mode described above, a W-phase stator component 60 is completed.

Subsequently, the V-phase stator component 40 is assembled to the U-phase stator component 20 from axially above, in a state of being shifted by a predetermined angle in the circumferential direction. In this case, the crossover wire portions 46 are disposed along the connecting portion 23, i.e., axially above the base portion 38, and radially outside the extended portion 39.

Furthermore, the W-phase stator component 60 is assembled to the V-phase stator component 40 and the U-phase stator component 20 from axially above, in a state of being shifted by a predetermined angle in the circumferential direction. In this case, the crossover wire portions 66 are disposed along the connecting portion 23, i.e., axially above the base portion 38, and radially outside the extended portion 39. Thus, a stator 10 is completed by assembling the U-phase stator component 20, the V-phase stator component 40, and the W-phase stator component 60 together.

Operation of the present embodiment will be described.

In the stator 10 of the present embodiment, the U-phase insulators 22 are connected to each other by a single connecting portion 23, while the V-phase insulators 42 and the W-phase insulators 62 are formed as separate bodies. Specifically, since the V- and W-phase stator components 40 and 60 are not provided with the connecting portion 23 as provided to the U-phase stator component 20, the stator 10 can be downsized in the axial direction.

Furthermore, in the stator 10 of the present embodiment, the stator components 20, 40 and 60 are separately handled at a stage prior to assemblage of these components.

In this case, in the U-phase stator component 20, the positions or the attitudes of the U-phase insulators 22 and the U-phase separated core elements 21 integrated therewith can be maintained due to integration of the U-phase insulators 22 with the connecting portion 23. Therefore, even though the winding start portions 27s and the winding end portions 27e connected to the crossover wire portions 26 are not fixed to the flange portions 25 of the U-phase insulators 22 in the U-phase windings U1 to U4, the U-phase windings U1 to U4 are less likely to be unwound from the winding start portions 27s and the winding end portions 27e connected to the crossover wire portions 26.

It should be noted that, since the winding start portion 27s of the first-winding U1 forming the terminal wire 28 of the U-phase conductor wire Eu is held by the retaining portion 37 of the first guide groove 31, the first U-phase winding U1 is less likely to be unwound from the terminal wire 28. Furthermore, similarly, since the winding end portion 27e of the fourth-winding U4 forming the terminal wire 29 of the U-phase conductor wire Eu is held by the retaining portion 37 of the second guide groove 32, the fourth U-phase winding U4 is less likely to be unwound from the terminal wire 29.

Furthermore, in the V-phase stator component 40, the retaining portions 57 for preventing the winding start portions 47s of the V-phase windings V1 to V4 from coming off are formed at the first guide grooves 51 of the respective V-phase insulators 42. Also, the retaining portions 58 for preventing the winding end portions 47e of the V-phase windings V1 to V4 from coming off are formed at the second guide grooves 52 of the respective V-phase insulators 42. Therefore, even when the V-phase insulators 42, which are separate from each other, are moved relative to each other, the winding start portions 47s and the winding end portions 47e of the V-phase windings V1 to V4 are ensured to be stably held by the first and second guide grooves 51 and 52.

Similarly, in the W-phase stator component 60, the retaining portions 77 for preventing the winding start portions 67s of the W-phase windings W1 to W4 from coming off are formed at the first guide grooves 71 of the respective W-phase insulators 62. Furthermore, the retaining portions 78 for preventing the winding end portions 67e of the W-phase windings W1 to W4 from coming off are formed at the second guide grooves 72 of the respective W-phase insulators 62. Therefore, even when the W-phase insulators 62, which are separate from each other, are moved relative to each other, the winding start portions 67s and the winding end portions 67e of the W-phase windings W1 to W4 are ensured to be stably held by the first and second guide grooves 71 and 72.

Advantageous effects of the present embodiment will be described.

(1) Since the V-phase stator component 40 includes no connecting portion connecting between the V-phase insulators 42, the stator 10 can be prevented from increasing size in the axial direction, while the V-phase windings V1 to V4 are maintained in shape by the retaining portions 57 and 58 when handling the V-phase stator component 40 separately. Similarly, since the W-phase stator component 60 includes no connecting portion connecting between the W-phase insulators 62, the stator 10 can be prevented from increasing size in the axial direction, while the W-phase windings W1 to W4 are maintained in shape by the retaining portions 77 and 78 when handling the W-phase stator component 60 separately.

(2) Each V-phase insulator 42 includes a wound portion 44 around which a corresponding one of the V-phase windings V1 to V4 is wound, and a flange portion 45 formed at a radially inner end of the wound portion 44 to abut against the corresponding one of the V-phase windings V1 to V4 in the radial direction. The first guide groove 51 and the second guide groove 52 are formed in the axial direction on the circumferential side surfaces of each flange portion 45. According to this mode, the winding start portion 47s and the winding end portion 47e which are guided respectively by the first and second guide grooves 51 and 52 can be disposed in the axial direction on the radially inner side of a corresponding one of the V-phase windings V1 to V4. Thus, the crossover wire portions 46 of the phase V can be disposed on the radially inner side of the V-phase windings V1 to V4 and, consequently, the length of the crossover wire portions 46 can be reduced.

Similarly, each W-phase insulator 62 includes a wound portion 64 around which a corresponding one of the W-phase windings W1 to W4 is wound, and a flange portion 65 formed at a radially inner end of the wound portion 64 to abut against the corresponding one of the W-phase windings W1 to W4 in the radial direction. The first guide groove 71 and the second guide groove 72 are formed in the axial direction on the circumferential side surfaces of each flange portion 65. According to this mode, the winding start portion 67s and the winding end portion 67e which are guided respectively by the first and second guide grooves 71 and 72 can be disposed in the axial direction on the radially inner side of a corresponding one of the W-phase windings W1 to W4. Thus, the crossover wire portions 66 of the phase W can be disposed on the radially inner side of the W-phase windings W1 to W4 and, consequently, the length of the crossover wire portions 66 can be reduced. It should be noted that, since the U-phase stator component 20 also has a similar configuration, the length of the crossover wire portions 26 of the phase U can be reduced.

(3) The crossover wire portions 46 of the phase V are disposed at one axial end of the V-phase stator component 40. Furthermore, the retaining portions 57 and 58 are partially provided to the axial ends of the first and second guide grooves 51 and 52, on the side where the respective crossover wire portions 46 are disposed. With this configuration, in the vicinities of the portions from which the winding start portions 47s and the winding end portions 47e shift to the respective crossover wire portions 46, the winding start portions 47s and the winding end portions 47e can be held by the retaining portions 57 and 58. Thus, the retaining portions 57 can suitably prevent the winding start portions 47s from being detached from the first groove portions 53 of the respective first guide grooves 51. Also, the retaining portions 58 can suitably prevent the winding end portions 47e from being detached from the first groove portions 55 of the respective second guide grooves 52. In addition, the winding start portions 47s and the winding end portions 47e can be easily assembled to the first groove portions 53 and 55, compared to the case where the retaining portions 57 and 58 are formed in the axial direction throughout the first groove portions 53 and 55.

Similarly, the crossover wire portions 66 of the phase W are disposed at one axial end of the W-phase stator component 60. Furthermore, the retaining portions 77 and 78 are partially provided to the axial ends of the first and second guide grooves 71 and 72, on the side where the respective crossover wire portions 66 are disposed. With this configuration, in the vicinities of the portions from which the winding start portions 67s and the winding end portions 67e shift to the respective crossover wire portions 66, the winding start portions 67s and the winding end portions 67e can be held by the retaining portions 77 and 78. Thus, the retaining portions 77 can suitably prevent the winding start portions 67s from being detached from the first groove portions 73 of the respective first guide grooves 71. Also, the retaining portions 78 can suitably prevent the winding end portions 67e from being detached from the first groove portions 75 of the respective second guide grooves 72. In addition, the winding start portions 67s and the winding end portions 67e can be easily assembled to the first groove portions 73 and 75, compared to the case where the retaining portions 77 and 78 are formed in the axial direction throughout the first groove portions 73 and 75.

(4) When one side in the circumferential direction with respect to each V-phase insulator 42 is referred to as a first side, and the side opposite to the first side is referred to as a second side, the first guide groove 51 is formed on the side surface of the flange portion 45 on the first side, and the second guide groove 52 is formed on the side surface of the flange portion 45 on the second side. Thus, the winding start portion 47s and the winding end portion 47e of each of the V-phase windings V1 to V4 can be held on both sides in the circumferential direction of a corresponding one of the flange portions 45.

Similarly, when one side in the circumferential direction with respect to each W-phase insulator 62 is referred to as a first side, and the side opposite to the first side is referred to as a second side, the first guide groove 71 is formed on the side surface of the flange portion 65 on the first side, and the second guide groove 72 is formed on the side surface of the flange portion 65 on the second side. Thus, the winding start portion 67s and the winding end portion 67e of each of the W-phase windings W1 to W4 can be held on both sides in the circumferential direction of a corresponding one of the flange portions 65.

(5) In each of the V-phase windings V2 and V3, the winding start portion 47s and the winding end portion 47e intersect each other on one axial end of the flange portion 45, and the winding start portion 47s is led out to the second side, i.e., to the first groove portion 55 in the circumferential direction, and the winding end portion 47e is led out to the first lateral side, i.e., to the first groove portion 53 in the circumferential direction. With this configuration, the winding start portion 47s and the winding end portion 47e can be engaged with each other to further suitably prevent detachment of the winding start portion 47s and the winding end portion 47e.

Similarly, in each of the W-phase windings W2 and W3, the winding start portion 67s and the winding end portion 67e intersect each other on one axial end of the flange portion 65, and the winding start portion 67s is led out to the second side, i.e., to the first groove portion 75 in the circumferential direction, and the winding end portion 67e is led out to the first side, i.e., to the first groove portion 73 in the circumferential direction. With this configuration, the winding start portion 67s and the winding end portion 67e can be engaged with each other to further suitably prevent detachment of the winding start portion 67s and the winding end portion 67e.

(6) The U-phase stator component 20, which is one of the three stator components 20, 40 and 60 included in the stator 10, is formed as a second stator component provided with the integrated molded member M in which a plurality of U-phase insulators 22 are integrated with the connecting portion 23 connecting between the U-phase insulators 22. With this configuration, the stator components 20, 40 and 60 can be easily assembled to each other using the U-phase stator component 20 as a base in which rigidity is ensured by the connecting portion 23.

(7) The crossover wire portions 26, 46 and 66 are provided along the connecting portion 23. In other words, the connecting portion 23 can be used as a guide member for the crossover wire portions 26, 46 and 66.

The present embodiment can be modified and implemented as follows. The present embodiment and the following modifications can be implemented in combination with each other within a technically consistent range.

In the above embodiment, the V-phase insulator 42 corresponding to the second V-phase winding V2, for example, is provided with the retaining portion 57 at the first guide groove 51 guiding the winding start portion 47s, and the retaining portion 58 at the second guide groove 52 guiding the winding end portion 47e. However, without being limited to this, either one of the retaining portions 57 and 58 may be omitted.

In this case, it is preferred to omit the retaining portion 57 of the first guide groove 51, leaving the retaining portion 58 of the second guide groove 52 alone for guiding the winding end portion 47e. With this configuration, of the winding start portion 47s and the winding end portion 47e intersecting each other, the winding end portion 47e located above is fixed by the retaining portion 58, and therefore, the winding start portion 47s is fixed by the winding end portion 47e located at a higher level in the intersection, even though there is no retaining portion 57 provided for fixing the winding start portion 47s. Accordingly, while assemblage is improved with the omission of the retaining portion 57 for the winding start portion 47s, detachment of both the winding start portion 47s and the winding end portion 47e can be prevented. The above modification can be applied to each of other windings in which the winding start portion and the winding end portion intersect each other.

In the U-phase stator component 20, for example, of the above embodiment, the terminal wires 28 and 29 are led out to the same side as the side on which the crossover wire portion 26 is disposed in the axial direction. However, these terminals may be led out to the side opposite to the side on which the crossover wire portion 26 is disposed. This modification can be applied to the V- and W-phase stator components 40 and 60.

In the V-phase stator component 40, for example, of the above embodiment, the retaining portions 57 and 58 are provided to only the axial ends of the respective first groove portions 53 and 55. However, other than this, for example, the retaining portions 57 and 58 may be provided throughout the first groove portions 53 and 55 in the axial direction. With this configuration, the winding start portion 47s and the winding end portion 47e can be more strongly held. This modification can be applied to the U- and W-phase stator components 20 and 60.

In the V-phase stator component 40, for example, of the above embodiment, the retaining portions 57 and 58 are provided respectively to the first groove portion 53 of the first guide groove 51 and the first groove portion 55 of the second guide groove 52. However, the configuration is not limited to this. For example, the retaining portions 57 and 58 may be respectively provided to the second groove portion 54 of the first guide groove 51 and the second groove portion 56 of the second guide groove 52. This modification can be applied to the U- and W-phase stator components 20 and 60.

In the V-phase stator component 40, for example, of the above embodiment, the winding start portions 47s and the winding end portions 47e of the V-phase windings V1 to V4 are disposed at the respective first guide grooves 51 and the respective second guide grooves 52. However, the configuration is not limited to this. For example, either of the winding start portion 47s and the winding end portion 47e may be led out of the wound portion 44, without being disposed at the guide groove. With this configuration, the winding start portion 47s and the winding end portion 47e can both be led out of one side of each V-phase separated core element 41 in the circumferential direction with respect to the circumferential center thereof. This modification can be applied to the U- and W-phase stator components 20 and 60.

Figure 12:
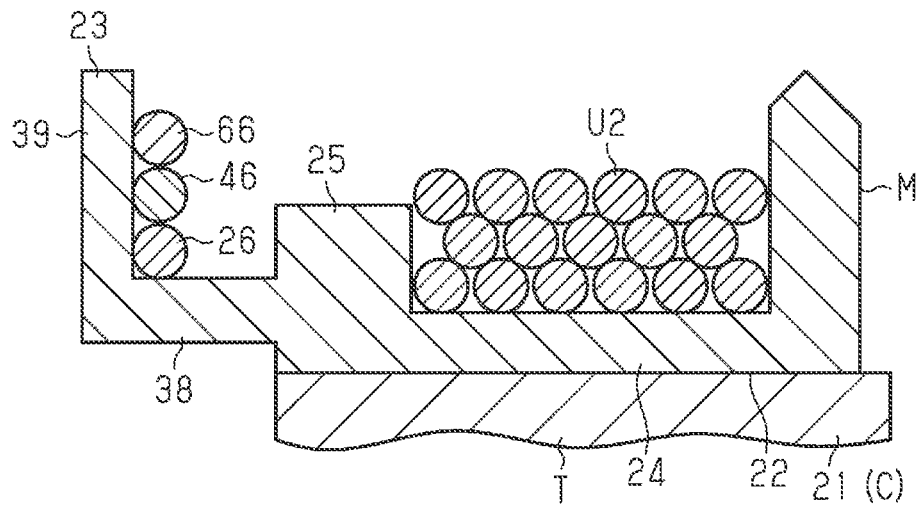
FIG. 12 is a cross-sectional view illustrating a part of a stator according to a modification.

As shown in FIG. 12, the crossover wire portions 26, 46 and 66 of the individual phases may be in contact with each other. With this configuration, the gaps between the crossover wire portions 26, 46 and 66 can be suppressed to prevent size increase in the axial direction. It should be noted that, in the example shown in FIG. 12, the crossover wire portions 26, 46 and 66 are insulated from each other by respective insulating films and thus are not electrically connected to each other.

Figure 13:
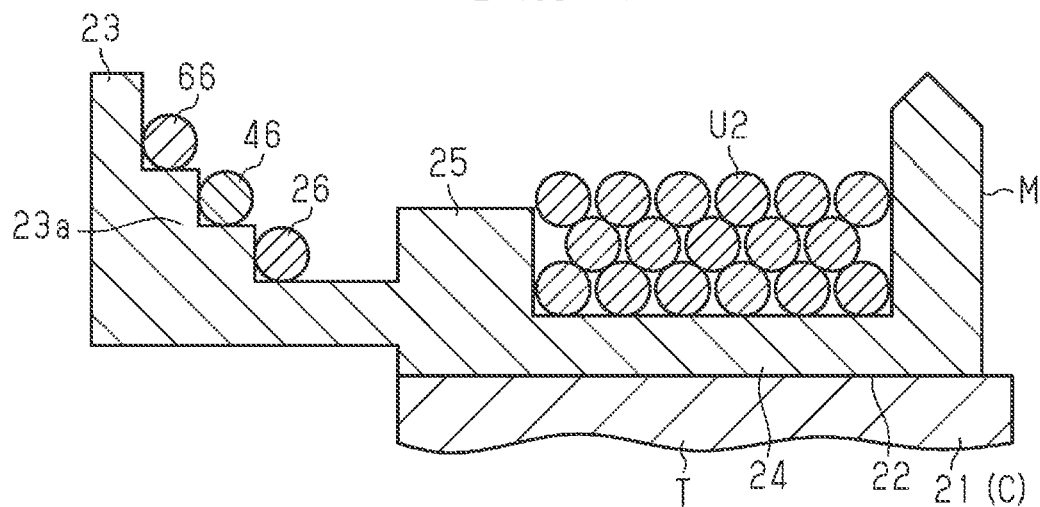
FIG. 13 is a cross-sectional view illustrating a part of a stator according to a modification.

As shown in FIG. 13, the crossover wire portions 26, 46 and 66 of the individual phases may be disposed on the steps of a stepped portion 23a formed on the connecting portion 23 to separate the crossover wire portions 26, 46 and 66 from each other. This configuration of separating the crossover wire portions 26, 46 and 66 from each other can contribute to improving insulation reliability.

Figure 14:
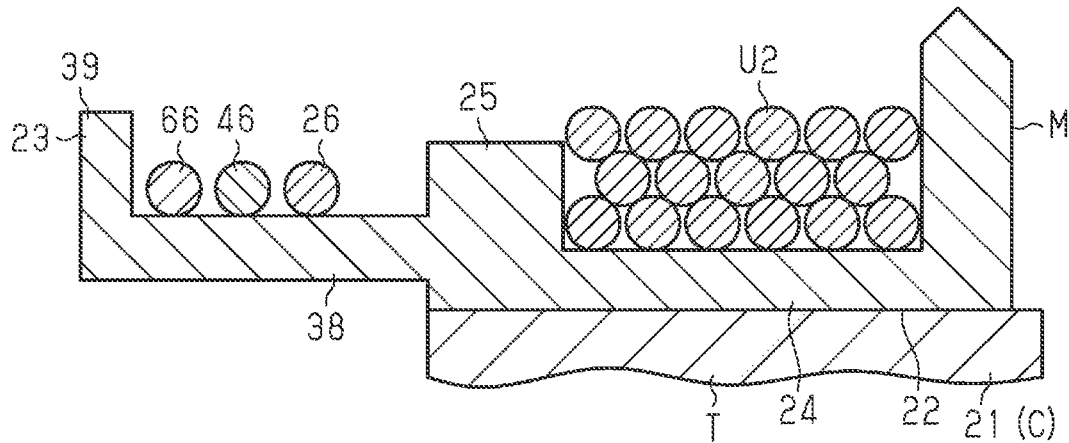
FIG. 14 is a cross-sectional view illustrating a part of a stator according to a modification.

As shown in FIG. 14, the crossover wire portions 26, 46 and 66 of the individual phases may be parallelly disposed in the radial direction. Although FIG. 14 shows a state where the crossover wire portions 26, 46 and 66 are disposed with a space therebetween, they may be in contact with each other. In this case, the crossover wire portions 26, 46 and 66 are insulated from each other by respective insulating films and thus are not electrically connected to each other.

Figure 15:
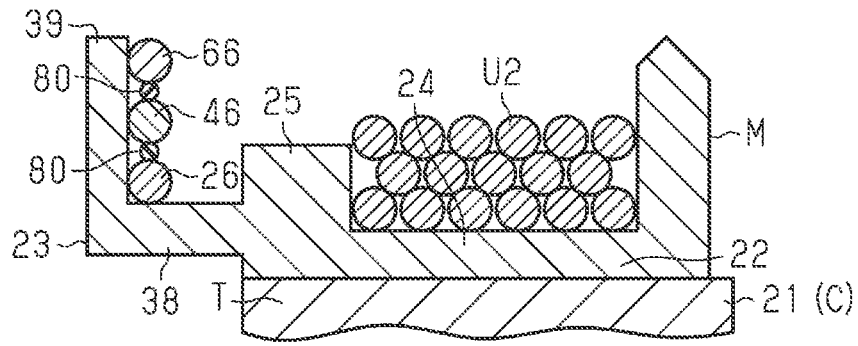
FIG. 15 is a cross-sectional view illustrating a part of a stator according to a modification.

As shown in FIG. 15, an annular insulating member 80, such as an O-ring, made of rubber may be placed between the crossover wire portions 26, 46 and 66 of the individual phases. With this configuration, electrical insulation between the crossover wire portions 26, 46 and 66 can be more reliably achieved. Furthermore, if the insulating member 80 is made of a material having high frictional resistance, such as rubber, misalignment between the crossover wire portions 26, 46 and 66 can be suppressed.

Figure 16:
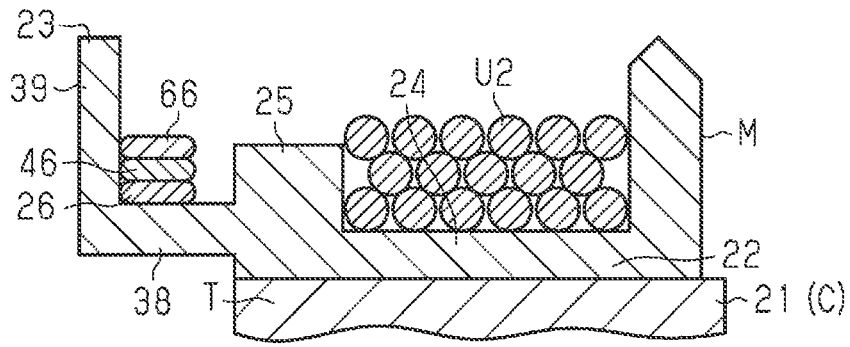
FIG. 16 is a cross-sectional view illustrating a part of a stator according to a modification.

As shown in FIG. 16, the crossover wire portions 26, 46 and 66 of the individual phases may be flattened by being pressed in the axial direction and plastically deformed. With this configuration, the stator 10 can be advantageously downsized in the axial direction.

Figure 17:
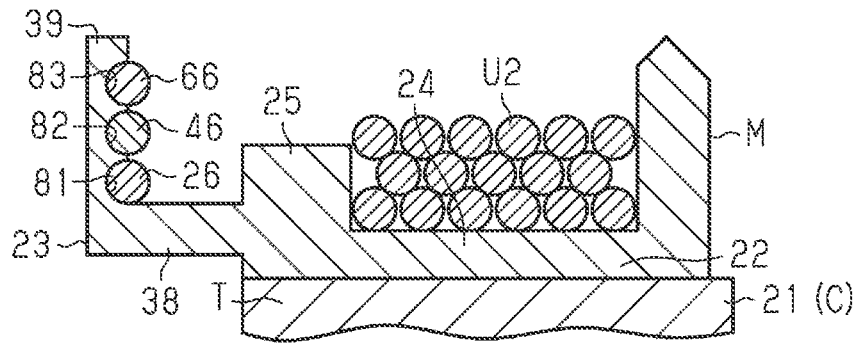
FIG. 17 is a cross-sectional view illustrating a part of a stator according to a modification.

As shown in FIG. 17, crossover wire holding grooves 81, 82, and 83 may be provided to the radially outer surface of the extended portion 39 of the connecting portion 23 to fit the respective crossover wire portions 26, 46 and 66 of the individual phases thereto. The crossover wire holding grooves 81, 82 and 83 are formed along a plane that is orthogonal to the axial line of the stator 10. With this configuration, the separated state of the crossover wire portions 26, 46 and 66 can be maintained and, consequently, the crossover wire portions 26, 46 and 66 can be reliably electrically insulated from each other.

Figure 18:
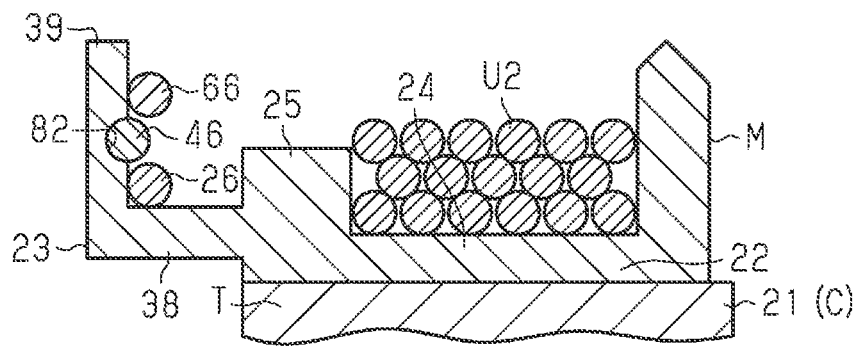
FIG. 18 is a cross-sectional view illustrating a part of a stator according to a modification.

In the configuration shown in FIG. 17, three crossover wire holding grooves 81, 82 and 83 are provided for the respective crossover wire portions 26, 46 and 66 of the individual phases. However, without being limited to this, for example, only a crossover wire holding groove 82, to which the V-phase crossover wire portion 46 is fitted, may be provided as shown in FIG. 18, omitting the crossover wire holding grooves 81 and 83 corresponding to the phases U and W. With this configuration, the V-phase crossover wire portion 46 held by the crossover wire holding groove 82 serves as a stopper to prevent other crossover wire portions 26 and 66 from moving to the axial direction. In addition, since only one crossover wire holding groove 82 is formed on the extended portion 39, wiring of the crossover wire portions 26, 46 and 66 is prevented from becoming complicated.

Figure 19:
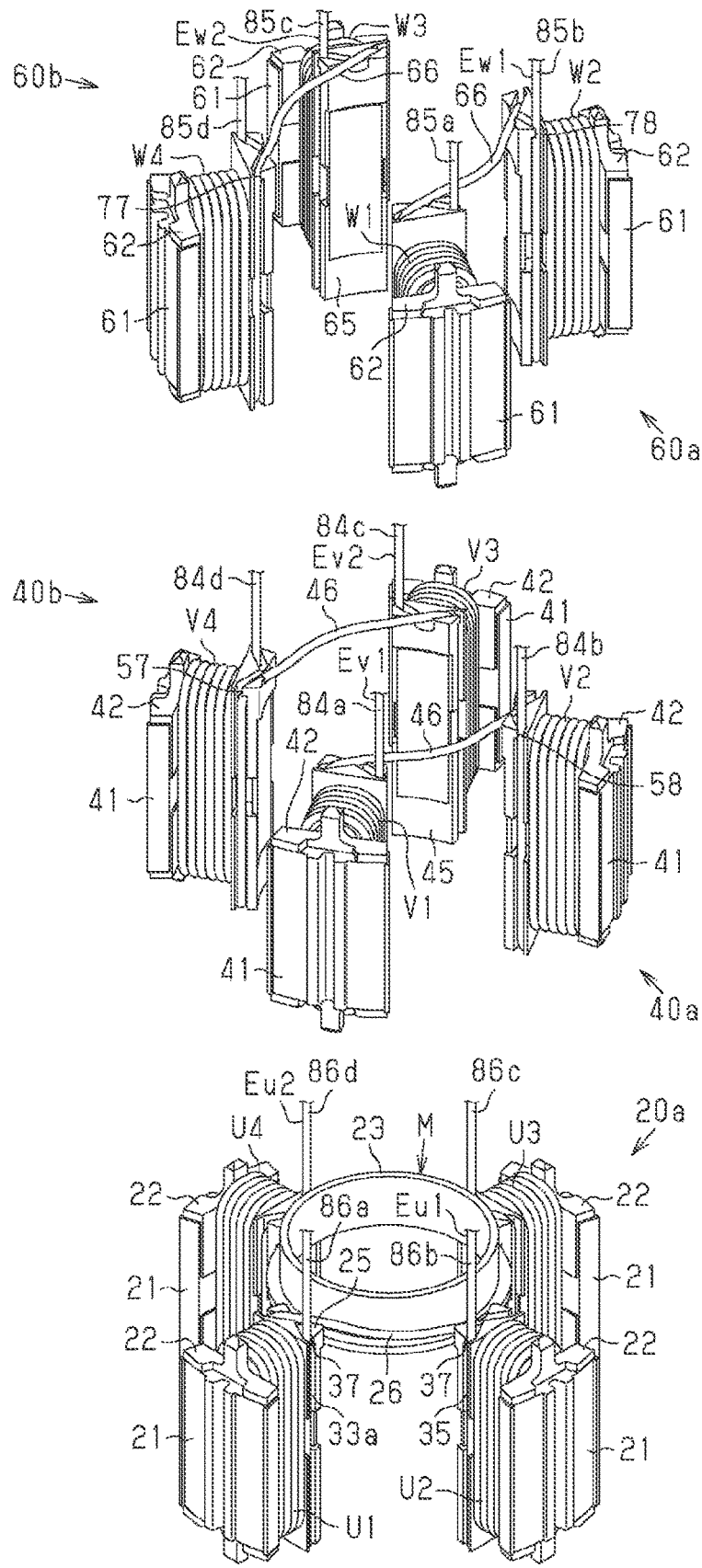
FIG. 19 is an exploded perspective view illustrating a stator according to a modification.

The stator 10 of the above embodiment includes one U-phase stator component 20, one V-phase stator component 40, and one W-phase stator component 60 corresponding to the individual phases of three-phase alternating current. However, without being limited to this, for example, the configuration can be modified as shown in FIG. 19. It should be noted that, in FIG. 19, reference signs that are the same as those of the above embodiment indicate the same components as those of the above embodiment, and therefore, the above descriptions should be referred to for these components.

The stator shown in FIG. 19 includes two V-phase stator components 40a and 40b having the same configuration, two W-phase stator components 60a and 60b having the same configuration, and one U-phase stator component 20a. In other words, the stator of this modification includes five stator components 20a, 40a, 40b, 60a and 60b.

One V-phase stator component 40a includes a first V-phase winding V1 and a second V-phase winding V2, while the other V-phase stator component 40b includes a third V-phase winding V3 and a fourth V-phase winding V4. The V-phase stator components 40a and 40b have the same configuration and are separated from each other by 90 degrees in the circumferential direction. Also, in each of the V-phase stator components 40a and 40b, a pair of V-phase separated core elements 41 are disposed, being separated from each other by approximately 90 degrees in the circumferential direction.

In the V-phase stator component 40a, the first and second V-phase windings V1 and V2 are formed of a single V-phase conductor wire Ev1. Furthermore, the first and second V-phase windings V1 and V2 are connected to each other by a crossover wire portion 46 which is part of the V-phase conductor wire Ev1. The winding start portion 47s of the first V-phase winding V1 is led out in the axial direction to form one terminal wire 84a of the V-phase conductor wire Ev1. The winding end portion 47e of the first V-phase winding V1 is connected to the winding start portion 47s of the second V-phase winding V2 via a crossover wire portion 46. The winding end portion 47e of the second V-phase winding V2 is led out in the axial direction to form the other terminal wire 84b of the V-phase conductor wire Ev1.

In the V-phase stator component 40b, the third and fourth V-phase windings V3 and V4 are formed of a single V-phase conductor wire Ev2. The third and fourth V-phase windings V3 and V4 are connected to each other by a crossover wire portion 46 which is part of the V-phase conductor wire Ev2. The winding start portion 47s of the third V-phase winding V3 is led out in the axial direction to form one terminal wire 84c of the V-phase conductor wire Ev2. The winding end portion 47e of the third V-phase winding V3 is connected to the winding start portion 47s of the fourth V-phase winding V4 via a crossover wire portion 46. The winding end portion 47e of the fourth V-phase winding V4 is led out in the axial direction to form the other terminal wire 84d of the V-phase conductor wire Ev2. The terminal wires 84a to 84d are led out to the same side in the axial direction.

In the phase W as well, similarly to the phase V, one W-phase stator component 60a includes a first W-phase winding W1 and a second W-phase winding W2, while the other W-phase stator component 60b includes a third W-phase winding W3 and a fourth W-phase winding W4. The W-phase stator components 60a and 60b have the same configuration and are separated from each other by 90 degrees in the circumferential direction. Also, in each of the W-phase stator components 60a and 60b, a pair of W-phase separated core elements 61 are disposed, being separated from each other by approximately 90 degrees in the circumferential direction.

In the W-phase stator component 60a, the first and second W-phase windings W1 and W2 are formed of a single W-phase conductor wire Ew1. Furthermore, the first and second W-phase windings W1 and W2 are connected to each other by a crossover wire portion 66 which is part of the W-phase conductor wire Ew1. The winding start portion 67s of the first W-phase winding W1 is led out in the axial direction to form one terminal wine 85a of the W-phase conductor wire Ew1. The winding end portion 67e of the first W-phase winding W1 is connected to the winding start portion 67s of the second W-phase winding W2 via a crossover wire portion 66. The winding end portion 67e of the second W-phase winding W2 is led out in the axial direction to form the other terminal wire 85b of the W-phase conductor wire Ew1.

In the W-phase stator component 60b, the third and fourth W-phase windings W3 and W4 are formed of a single W-phase conductor wire Ew2. The third and fourth W-phase windings W3 and W4 are connected to each other by a crossover wire portion 66 which is part of the W-phase conductor wire Ew2. The winding start portion 67s of the third W-phase winding W3 is led out in the axial direction to form one terminal wire 85c of the W-phase conductor wire Ew2. The winding end portion 67e of the third W-phase winding W3 is connected to the winding start portion 67s of the fourth W-phase winding W4 via a crossover wire portion 66. The winding end portion 67e of the fourth W-phase winding W4 is led out in the axial direction to form the other terminal wire 85d of the W-phase conductor wire Ew2. The terminal wires 85a to 85d are led out to the same side in the axial direction.

The U-phase stator component 20a includes an integrated molded member M similarly to the U-phase stator component 20 of the above embodiment. In other words, the U-phase stator component 20a includes a connecting portion 23 connecting the four U-phase insulators 22 each other which are provided to the respective four U-phase separated core elements 21.

In the U-phase stator component 20a, the first and second U-phase windings U1 and U2 are formed of a single U-phase conductor wire Eu1. Furthermore, the first and second U-phase windings U1 and U2 are connected to each other by a crossover wire portion 26 which is part of the U-phase conductor wire Eu1. The winding start portion 27s of the first U-phase winding U1 is led out in the axial direction to form one terminal wire 86a of the U-phase conductor wire Eu1. The winding end portion 27e of the first U-phase winding U1 is connected to the winding start portion 27s of the second U-phase winding U2 via a crossover wire portion 26. The winding end portion 27e of the second U-phase winding U2 is led out in the axial direction to form the other terminal wire 86b of the U-phase conductor wire Eu1.

The third and fourth U-phase windings U3 and U4 are formed of a single U-phase conductor wire Eu2. The third and fourth U-phase windings U3 and U4 are connected to each other by a crossover wire portion 26 which is part of the U-phase conductor wire Eu2. The winding start portion 27s of the third U-phase winding U3 is led out in the axial direction to form one terminal wire 86c of the U-phase conductor wire Eu2. The winding end portion 27e of the third U-phase winding U3 is connected to the winding start portion 27s of the fourth U-phase winding U4 via a crossover wire portion 26. The winding end portion 27e of the fourth U-phase winding U4 is led out in the axial direction to form the other terminal wire 86d of the U-phase conductor wire Eu2. The terminal wires 86a to 86d are led out to the same side in the axial direction. The terminal wires 84a to 84d, 85a to 85d, and 86a to 86d of the individual phases are led out to the same side in the axial direction.

In the above configuration as well, retaining portions 57 and 58 are formed in the respective V-phase insulators 42 of the V-phase stator components 40a and 40b, the shapes of the V-phase windings V1 to V4 of the V-phase stator components 40a and 40b can be retained when handling these components separately by retaining portions 57 and 58. Furthermore, retaining portions 77 and 78 are formed in the respective W-phase insulators 62 of the W-phase stator components 60a and 60b, the shapes of the W-phase windings W1 to W4 of the W-phase stator components 60a and 60b can be retained when handling these components separately by retaining portions 77 and 78.

In the U-phase stator component 20a having the configuration shown in FIG. 19, a single connecting portion 23 connects all the U-phase insulators 22 to each other. However, without being particularly limited to this, for example, the configuration can be further modified as shown in FIG. 20.

Figure 20:
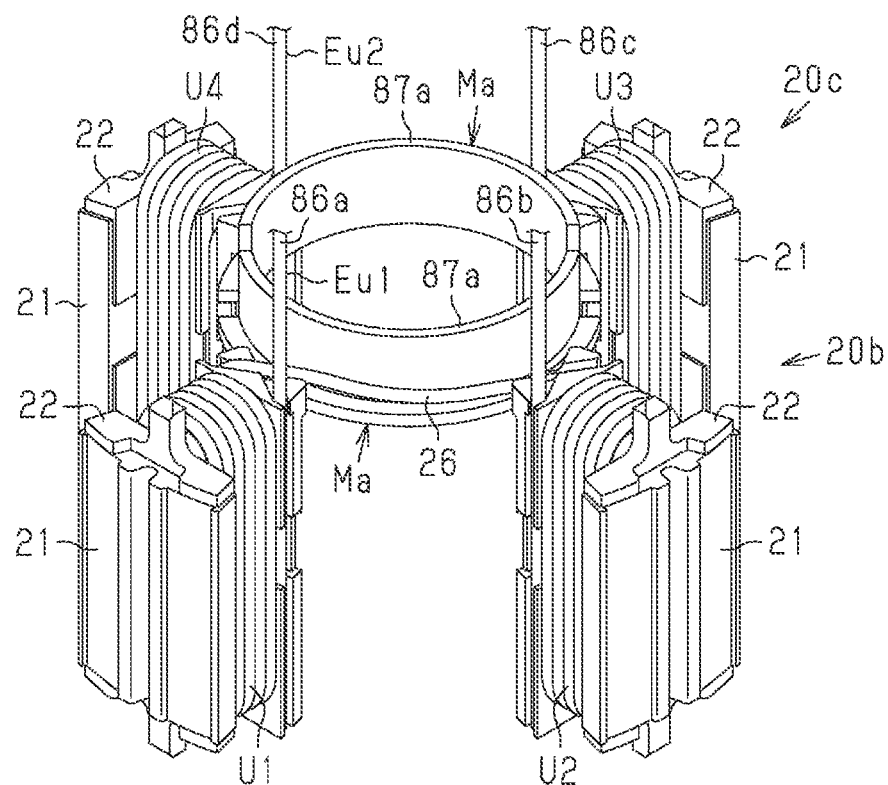
FIG. 20 is a perspective view illustrating a U-phase stator component according to a modification.

The stator shown in FIG. 20 includes two U-phase stator components 20b and 20c.

One U-phase stator component 20b includes a first U-phase winding U1 and a second U-phase winding U2. Furthermore, the U-phase stator component 20b includes a connecting portion 87a connecting between the two U-phase insulators 22 respectively provided to the first and second U-phase windings U1 and U2. In other words, the U-phase stator component 20b includes an integrated molded member Ma in which the two U-phase insulators 22 are integrated with the connecting portion 87a connecting between the two U-phase insulators 22.

The other U-phase stator component 20c has a configuration similar to that of the U-phase stator component 20b. Specifically, the U-phase stator component 20c includes a third U-phase winding U3 and a fourth U-phase winding U4. Furthermore, the U-phase stator component 20c includes a connecting portion 87a connecting between the two U-phase insulators 22 respectively provided to the third and fourth U-phase windings U3 and U4. In other words, the U-phase stator component 20c includes an integrated molded member Ma in which the two U-phase insulators 22 are integrated with the connecting portion 87a connecting between the two U-phase insulators 22. The connecting portions 87a of the U-phase stator components 20b and 20c each have a configuration corresponding to one half of the connecting portion 23 of the above embodiment, i.e., have a semicircular arc shape as viewed in the axial direction.

Figure 21:
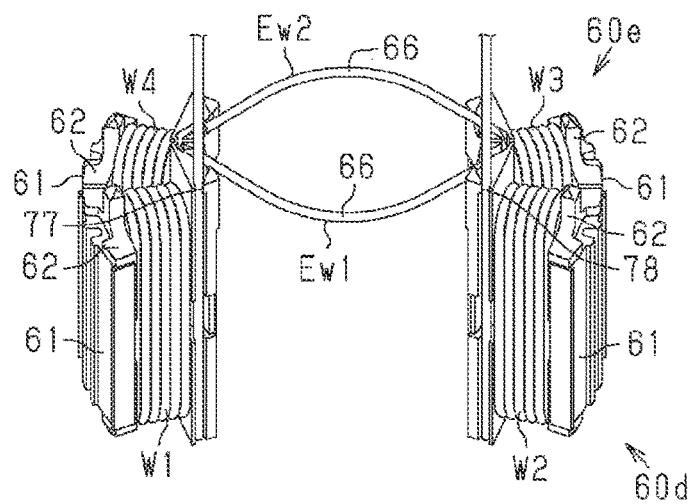
FIG. 21 is an exploded perspective view illustrating a stator according to a modification.
Figure 21:
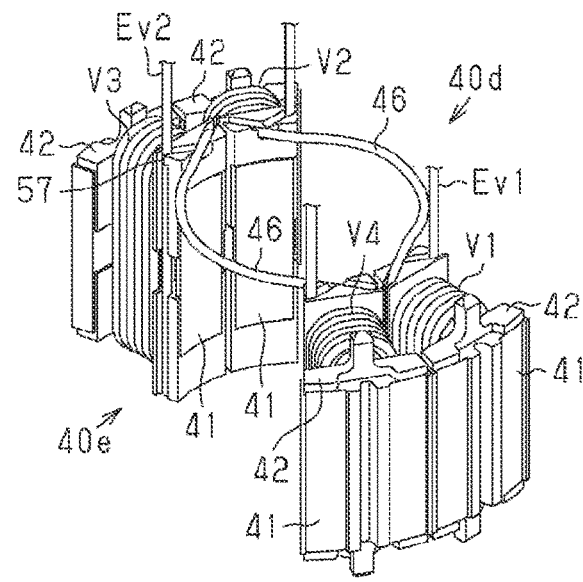
Figure 21:
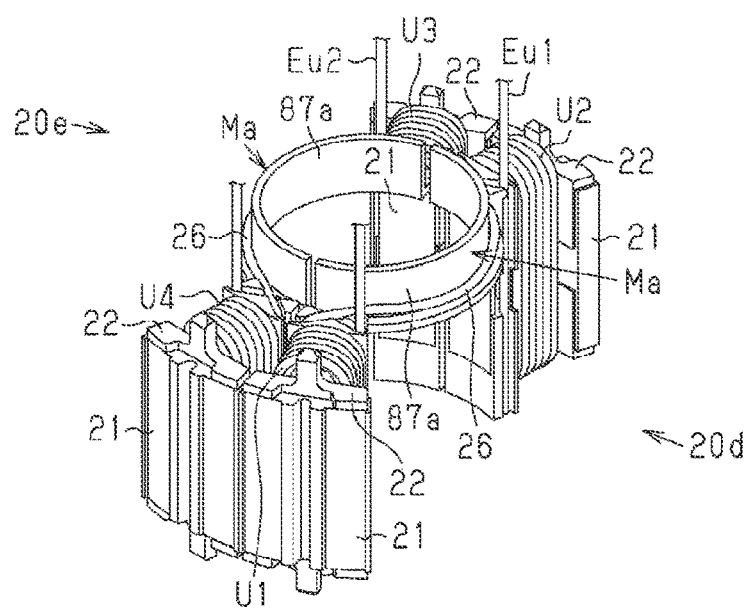

Furthermore, a 6-split structure can be formed by combining the two U-phase stator components 20b and 20c shown in FIG. 20, the two V-phase stator components 40a and 40b shown in FIG. 19, and the two W-phase stator components 60a and 60b shown in FIG. 19. However 6-split structures other than this may be adopted. One example of this is shown in FIG. 21. It should be noted that, in FIG. 21, reference signs that are the same as those of the above embodiment indicate the same components as those of the above embodiment, and therefore, the above descriptions should be referred to for these components.

The stator shown in FIG. 21 includes two U-phase stator components 20d and 20e, two V-phase stator components 40d and 40e, and W-phase stator components 60d and 60e.

One U-phase stator component 20d includes two U-phase separated core elements 21, two U-phase insulators 22 respectively provided to the two U-phase separated core elements 21, and first and second U-phase windings U1 and U2 respectively wound around the two U-phase separated core elements 21 via the U-phase insulators 22. The other U-phase stator component 20e includes two U-phase separated core elements 21, two U-phase insulators 22 respectively provided to the two U-phase separated core elements 21, and third and fourth U-phase windings U3 and U4 respectively wound around the two U-phase separated core elements 21 via the U-phase insulators 22.

In the U-phase stator component 20d, the first and second U-phase windings U1 and U2 are formed of a single U-phase conductor wire Eu1, and connected to each other via a crossover wire portion 26 which is part of the U-phase conductor wire Eu1. Similarly, in the U-phase stator component 20e, the third and fourth U-phase windings U3 and U4 are formed of a single U-phase conductor wire Eu2, and connected to each other via a crossover wire portion 26 which is part of the U-phase conductor wire Eu2.

In each of the U-phase stator components 20d and 20e, a pair of U-phase separated core elements 21 are disposed, being separated from each other by approximately 150 degrees in the circumferential direction. Also, a U-phase separated core element 21 of one U-phase stator component 20d and a U-phase separated core element 21 of the other U-phase stator component 20e are adjacent in the circumferential direction. Thus, the first and fourth U-phase windings U1 and U4 are adjacent to each other in the circumferential direction, and the second and third U-phase windings U2 and U3 are adjacent to each other in the circumferential direction.

Furthermore, one V-phase stator component 40d includes two V-phase separated core elements 41, two V-phase insulators 42 respectively provided to the two V-phase separated core elements 41, and first and second V-phase windings V1 and V2 respectively wound around the two V-phase separated core elements 41 via the V-phase insulators 42. Furthermore, the other V-phase stator component 40e includes two V-phase separated core elements 41, two V-phase insulators 42 respectively provided to the two V-phase separated core elements 41, and third and fourth V-phase windings V3 and V4 respectively wound around the two V-phase separated core elements 41 via the V-phase insulators 42.

In the V-phase stator component 40d, the first and second V-phase windings V1 and V2 are formed of a single V-phase conductor wire Ev1, and connected to each other via a crossover wire portion 46 which is part of the V-phase conductor wire Ev1. Similarly, in the V-phase stator component 40e, the third and fourth V-phase windings V3 and V4 are formed of a single V-phase conductor wire Ev2, and connected to each other via a crossover wire portion 46 which is part of the V-phase conductor wire Ev2.

In each of the V-phase stator components 40d and 40e, a pair of V-phase separated core elements 41 are disposed, being separated from each other by approximately 150 degrees in the circumferential direction. Also, a V-phase separated core element 41 of one V-phase stator component 40d and a V-phase separated core element 41 of the other V-phase stator component 40e are adjacent in the circumferential direction. Thus, the first and fourth V-phase windings V1 and V4 are adjacent to each other in the circumferential direction, and the second and third V-phase windings V2 and V3 are adjacent to each other in the circumferential direction.

Furthermore, one W-phase stator component 60d includes two W-phase separated core elements 61, two W-phase insulators 62 respectively provided to the two W-phase separated core elements 61, and first and second W-phase windings W1 and W2 respectively wound around the two W-phase separated core elements 61 via the W-phase insulators 62. Furthermore, the other W-phase stator component 60e includes two W-phase separated core elements 61, two W-phase insulators 62 respectively provided to the two W-phase separated core elements 61, and third and fourth W-phase windings W3 and W4 respectively wound around the two W-phase separated core elements 61 via the W-phase insulators 62.

In the W-phase stator component 60d, the first and second W-phase windings W1 and W2 are formed of a single W-phase conductor wire Ew1, and connected to each other via a crossover wire portion 66 which is part of the W-phase conductor wire Ew1. Similarly, in the W-phase stator component 60e, the third and fourth W-phase windings W3 and W4 are formed of a single W-phase conductor wire Ew2, and connected to each other via a crossover wire portion 66 which is part of the W-phase conductor wire Ew2.

In each of the W-phase stator components 60d and 60e, a pair of W-phase separated core elements 61 are disposed, being separated from each other by approximately 150 degrees in the circumferential direction. Also, a W-phase separated core element 61 of one W-phase stator component 60d and a W-phase separated core element 61 of the other W-phase stator component 60e are adjacent in the circumferential direction. Thus, the first and fourth W-phase windings W1 and W4 are adjacent to each other in the circumferential direction, and the second and third W-phase windings W2 and W3 are adjacent to each other in the circumferential direction.

In the above configuration as well, retaining portions 57 and 58 are formed in the respective V-phase insulators 42 of the V-phase stator components 40d and 40e, the shapes of the V-phase windings V1 to V4 of the V-phase stator components 40d and 40e can be retained when handling these components separately by retaining portions 57 and 58. Furthermore, retaining portions 77 and 78 are formed in the respective W-phase insulators 62 of the W-phase stator components 60d and 60e, the shapes of the W-phase windings W1 to W4 of the W-phase stator components 60d and 60e can be retained when handling these components separately by retaining portions 77 and 78.

In the above embodiment, the winding start portion 27s and the winding end portion 27e of each of the U-phase windings U1 to U4 intersect each other as viewed in the axial direction. Also, the winding start portion 47s and the winding end portion 47e of each of the V-phase windings V1 to V4 intersect each other as viewed in the axial direction. Furthermore, the winding start portion 67s and the winding end portion 67e of each of the W-phase windings W1 to W4 intersect each other as viewed in the axial direction. In this regard, as show in FIG. 22, for example, the winding start portion and the winding end portion do not have to necessarily intersect each other in each winding.

Figure 22:
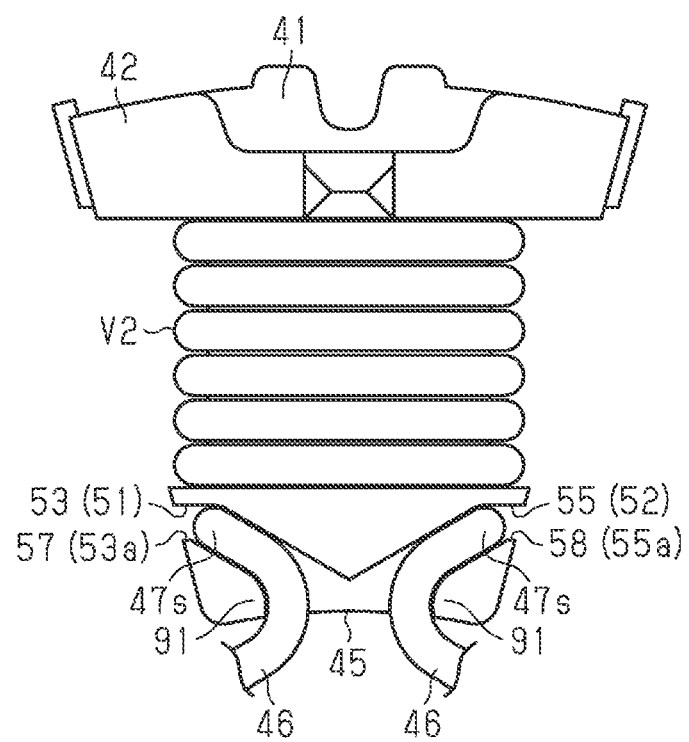
FIG. 22 is a plan view illustrating a V-phase stator component according to a modification.

FIG. 22 shows the second V-phase winding V2 as an example. In the configuration shown in this figure, in the flange portion 45 of the V-phase insulator 42, the retaining portion 57 is provided to the first groove portion 53 of the first guide groove 51, and the retaining portion 58 is provided to the first groove portion 55 of the second guide groove 52. When one side in the circumferential direction with respect to the V-phase insulator 42 is referred to as a first side, and the side opposite to the first side is referred to as a second side, the first guide groove 51 guiding the winding start portion 47s is formed on the side surface of the flange portion 45 on the first side, and the second guide groove 52 guiding the winding end portion 47e is formed on the side surface of the flange portion 45 on the second side. Furthermore, of the winding start portion 47s and the winding end portion 47e led out of the second V-phase winding V2, the winding start portion 47s is led out to the first side in the circumferential direction, and the winding end portion 47e is led out to the second side in the circumferential direction.

With this configuration, the winding start portion 47s and the winding end portion 47e of the second V-phase winding V2 can be configured so as not to intersect each other as viewed in the axial direction. Consequently, the stator 10 can be downsized in the axial direction by a volume corresponding to the volume of the intersection of these wire portions. Also, due to provision of the retaining portions 57 and 58 to the first and second guide grooves 51 and 52, the winding start portion 47s and the winding end portion 47e are unlikely to be detached from the grooves without the need of having them intersected each other. Accordingly, this configuration is preferred from the perspective of automating assemblage using machines.

In the configuration shown in FIG. 22, the flange portion 45 is provided with a pair of projections 91 projecting in the axial direction. These projections 91 are respectively engaged with portions which cause the winding start portion 47s and the winding end portion 47e to bend in a U shape as viewed in the axial direction. Due to the presence of the projections 91, the winding start portion 47s can be easily led out to the first side, and the winding end portion 47e can be easily led out to the second side.

The above embodiment adopts a configuration in which the connecting portion 23 is formed to have substantially an L-shaped cross section. However, the configuration is not limited to this. A configuration in which the connecting portion 23 is formed to have substantially a T-shaped cross section may be adopted. As a T-shaped configuration, the connecting portion 23 may be formed to extend from radially inside the base portion 38 along both sides in the axial direction. In this case, the crossover wire portions may be routed, as necessary, on both sides in the axial direction of the base portion 38.

The above embodiment adopts a configuration in which the U-phase insulators 22 of the U-phase stator component 20 are connected to each other via the connecting portion 23. However, the configuration is not limited to this. For example, there may be adopted a configuration in which the V-phase insulators 42 of the V-phase stator component 40 are connected to each other via a connecting portion, or a configuration in which the W-phase insulators 62 of the W-phase stator component 60 are connected to each other via a connecting portion.

In the above embodiment, the U-phase stator component 20, which is one of the three stator components 20, 40 and 60 of the stator 10, serves as a second stator component including an integrated molded member M. However, without being limited to this, two of the three stator components 20, 40 and 60 may serve as second stator components. Alternatively, there may be adopted a configuration in which the stator 10 includes no second stator component, i.e., all the stator components 20, 40 and 60 serve as first stator components. In other words, the connecting portion 23 may be omitted from the U-phase stator component 20 of the above embodiment so as to have a configuration similar to those of the V- and W-phase stator components 40 and 60. With this configuration, size increase of the stator 10 in the axial direction in particular can be prevented.

The configuration of the U-phase stator component 20, including the shape of the connecting portion 23, is not limited to the above embodiment. For example, the extended portion 39 may be omitted from the connecting portion 23 of the above embodiment.

The above embodiment is applied to a stator in which the number of windings is 12, i.e., the number of slots is 12. However, without being limited to this, for example, the number may be appropriately changed depending on the number of magnetic poles of the rotor.

Although it is not particularly referred to in the above embodiment, there may be adopted a configuration in which U-phase current, V-phase current and W-phase current are supplied to the individual windings using a single-system drive circuit, or a configuration in which current is supplied to the individual windings using a multi-system drive circuit, such as two-system drive circuit.

A technical idea derived from the above embodiment and modifications will be described.

A stator in which the winding end portion intersects the winding start portion so as to be located above the winding start portion, and, of the first guide groove and the second guide groove, only the second guide groove is provided with the retaining portion.

With this configuration, of the winding start portion and the winding end portion intersecting each other, the winding end portion located above is fixed by the retaining portion, and therefore, the winding start portion is fixed by the winding end portion located above in the intersection, even though there is no retaining portion for fixing the winding start portion. Accordingly, while assemblage is improved with the omission of the retaining portion for the winding start portion, detachment of both the winding start portion and the winding end portion can be prevented.

The present disclosure has been described based on some embodiments; however, the present disclosure should not be construed as being limited to these embodiments and configurations. The scope of the present disclosure should encompass various modifications or equivalents. In addition, various combinations or modes, and further, other combinations or modes including one or more additional elements or fewer elements of the various combinations or modes should also be included within the category or idea of the present disclosure.

What is claimed is:

1. A stator comprising:
a stator core including a plurality of core segments annularly disposed in a circumferential direction;
a plurality of stator components, wherein
each of the stator components comprises:
a plurality of separated core elements that are not adjacent to each other in the circumferential direction, at least two core segments among the plurality of core segments serving as the plurality of separated core elements;
a plurality of insulators that are provided to the respective plurality of separated core elements, elements; and
a plurality of windings that are concentrically wound around the respective plurality of separated core elements via the corresponding insulators, and are supplied with currents having the same phase as each other,
in each of the stator components, the plurality of windings are formed of a single conductor wire, with the plurality of windings being connected to each other via a crossover wire portion which is part of the single conductor wire,
at least one of the plurality of stator components is a first stator component in which the plurality of insulators are separate from each other,
the insulators of the first stator component each include a guide groove for guiding a leader led out of a corresponding one of the windings and connected to the crossover wire portion,
the guide groove includes an opening in which the leader is inserted in the guide groove in a direction orthogonal to a longitudinal direction of the leader,
the guide groove includes, at at least a part of the guide groove in a direction in which the guide groove extends, a retaining portion in which a width of the opening is smaller than a diameter of the leader, and
a part of the plurality of stator components is a second stator component, the second stator component including an integrated molded member in which the plurality of insulators are integrally formed with a connecting portion connecting between the plurality of insulators,
wherein a remaining part of the plurality of stator components is not integrally formed with the connection portion.

2. The stator according to claim 1, wherein
each of the insulators of the first stator component comprises:
a wound portion around which a corresponding one of the windings is wound; and
a flange portion that is formed at a radially inner end of the wound portion and abuts against the corresponding one of the windings in a radial direction, and
the guide groove is formed on circumferential side surfaces of the flange portion along an axial direction.

3. The stator according to claim 2, wherein
the crossover wire portion of the first stator component is disposed at a first axial end of the first stator component, and
the retaining portion is partially provided to an axial end of the guide groove, the axial end being on a side where the crossover wire portion is disposed.

4. The stator according to claim 3, wherein
the leader includes a winding start portion and a winding end portion;portion, and
the guide groove includes a first guide groove that guides the winding start portion of a corresponding one of the windings, and a second guide groove that guides the winding end portion of the corresponding one of the windings.

5. The stator according to claim 4, wherein
in response to one side in a circumferential direction with respect to each insulator serving as a first side, and a side opposite to the first side serving as a second side,
the flange portion includes a first side surface on the first side and a second side surface on the second side,
the first guide groove is formed on the first side surface of the flange portion;portion, and
the second guide groove is formed on the second side surface of the flange portion.

6. The stator according to claim 5, wherein the winding start portion and the winding end portion led out of the same winding intersect each other on a first axial end of the flange portion, with the winding start portion being led out to the second side, and the winding end portion being led out to the first side.

7. The stator according to claim 5, wherein
each of the first guide groove and the second guide groove is provided with the retaining portion, and
of the winding start portion and the winding end portion led out of the same winding, the winding start portion is led out to the first side, and the winding end portion is led out to the second side.

8. The stator according to claim 1, wherein
the leader includes a winding start portion and a winding end portion, and
the guide groove includes a first guide groove that guides the winding start portion of a corresponding one of the windings, and a second guide groove that guides the winding end portion of the corresponding one of the windings.

9. The stator according to claim 8, wherein each of the first guide groove and the second guide groove is provided with the retaining portion.

10. The stator according to claim 1, wherein the crossover wire portion of the first stator component and the crossover wire portion of the second stator component are provided along the connecting portion.

* * * * *